(12) United States Patent
Damnjanovic et al.

(10) Patent No.: US 11,558,878 B2
(45) Date of Patent: Jan. 17, 2023

(54) PRIORITIZATION TECHNIQUES BETWEEN COMMUNICATION LINKS

(71) Applicant: QUALCOMM Incorporated, San Diego, CA (US)

(72) Inventors: Jelena Damnjanovic, Del Mar, CA (US); Tao Luo, San Diego, CA (US); Sony Akkarakaran, Poway, CA (US); Juan Montojo, San Diego, CA (US); Junyi Li, Fairless Hills, PA (US); Hong Cheng, Basking Ridge, NJ (US); Sudhir Kumar Baghel, Hillsborough, NJ (US); Yan Zhou, San Diego, CA (US); Mahmoud Taherzadeh Boroujeni, San Diego, CA (US); Jung Ho Ryu, Fort Lee, NJ (US); Jingchao Bao, San Diego, CA (US); Wooseok Nam, San Diego, CA (US); Ling Ding, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/153,760

(22) Filed: Jan. 20, 2021

(65) Prior Publication Data

US 2021/0266917 A1 Aug. 26, 2021

Related U.S. Application Data

(60) Provisional application No. 62/981,986, filed on Feb. 26, 2020.

(51) Int. Cl.
*H04W 72/04* (2009.01)
*H04W 72/10* (2009.01)
*H04W 72/14* (2009.01)

(52) U.S. Cl.
CPC ......... *H04W 72/10* (2013.01); *H04W 72/042* (2013.01); *H04W 72/14* (2013.01)

(58) Field of Classification Search
CPC . H04W 72/1263; H04W 72/14; H04W 72/10; H04W 72/02; H04W 72/042;
(Continued)

(56) References Cited

U.S. PATENT DOCUMENTS 6,356,622 B1 * 3/2002 Hassell ............. H04M 3/42195
  379/1.01
9,729,295 B2 * 8/2017 Zhang ................... H04L 1/1861
(Continued)

FOREIGN PATENT DOCUMENTS

WO WO-2020006366 A1 1/2020

OTHER PUBLICATIONS

Huawei, et al., "Discussion on Prioritization Between UL Tx and V2X SL TX", 3GPP TSG RAN WG2 Meeting #96, 3GPP Draft; R2-167929 Discussion on Prioritization Between UL Transmission and V2X SL, 3rd Generation Partnership Project (3GPP), Mobile Competence Centre, 650, Route Des Lucioles, F-06921 Sophia-An, vol. Ran WG2, No. Reno, USA; Nov. 14, 2016-Nov. 18, 2016, Nov. 13, 2016 (Nov. 13, 2016), pp. 1-3, XP051177664, Retrieved from the Internet: URL: http://www.3gpp.org/ftp/Meetings_3GPP_SYNC/RAN2/Docs/ [retrieved on Nov. 13, 2016] Section "2. Discussion" until Proposal 4.
(Continued)

*Primary Examiner* — Wei Zhao
(74) *Attorney, Agent, or Firm* — Holland & Hart LLP

(57) ABSTRACT

Methods, systems, and devices for wireless communications are described. A first user equipment (UE) may be scheduled for communicating a first message over a first communication link with a base station and a second message over second communication link with a second UE. The first UE may select to communicate using the first communication link or the second communication link based on one or more prioritization rules that may involve the priority of the first
(Continued)

message and the second message. The first UE may identify a mapping between the priority of the first message and the priority of the second message that may enable a comparison of the priorities of the first message and the second message. The first UE may select to communicate using the communication link of the message associated with the higher priority.

30 Claims, 18 Drawing Sheets

(58) Field of Classification Search
CPC ........... H04W 72/005; H04W 28/0284; H04W 28/0289; H04W 28/028; H04W 28/26; H04W 92/18; H04W 72/126
See application file for complete search history.

(56) References Cited

U.S. PATENT DOCUMENTS

| | | |
|---|---|---|
| 2013/0294318 A1 | 11/2013 | Amerga et al. |
| 2017/0331670 A1* | 11/2017 | Parkvall ................ H04W 24/10 |
| 2020/0045724 A1 | 2/2020 | Lu et al. |
| 2021/0051672 A1 | 2/2021 | Rastegardoost et al. |

OTHER PUBLICATIONS

International Search Report and Written Opinion—PCT/US2021/014326—ISA/EPO—dated May 26, 2021.

* cited by examiner

PRIORITIZATION TECHNIQUES BETWEEN COMMUNICATION LINKS

CROSS REFERENCE

The present Application for Patent claims the benefit of U.S. Provisional Patent Application No. 62/981,986 by DAMNJANOVIC et al., entitled "PRIORITIZATION TECHNIQUES BETWEEN COMMUNICATION LINKS," filed Feb. 26, 2020, assigned to the assignee hereof, and expressly incorporated by reference herein.

FIELD OF TECHNOLOGY

The following relates generally to wireless communications and more specifically to prioritization techniques between communication links.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment.

SUMMARY

The described techniques relate to improved methods, systems, devices, and apparatuses that support prioritization techniques between communication links. Generally, the described techniques provide for improved prioritization rules at a user equipment (UE) for selecting to communicate with a first device or a second device in the event that the UE is scheduled for simultaneous communications with both the first device and the second device. In some wireless communications systems, a UE may be able to communicate with a base station using a first communication link and may be able to communicate with one or more other UEs using a second communication link, different from the first communication link. In some examples, the second communication link may be referred to as a sidelink or a peer-to-peer link.

Having two independent communication links active at the same time may create a conflict or collision in examples in which a UE is scheduled to communicate via the first communication link and the second communication link using the same transmission or reception resources. For example, a first UE may have a first message to transmit to the base station over the first communication link and a second message to transmit to a second UE over the second communication link, but the first UE may be incapable of transmitting the first message and the second message at the same time. In such examples, the first UE may determine which message to transmit (e.g., which message to transmit first and which message to transmit second) based on one or more prioritization techniques.

In some wireless techniques, such prioritization may include comparing a priority parameter of the second message to be conveyed over the second wireless communication link (e.g., the sidelink) to the second UE to a threshold. For example, if the priority parameter exceeds the threshold, the first UE may transmit the second message. Alternatively, if the priority parameter fails to exceed the threshold, the first UE may transmit the first message instead. Such prioritization techniques, however, may not evaluate a priority parameter associated with the first message that is scheduled for transmission to the base station over the first communication link.

Techniques are described herein for the first UE to prioritize which message to send based on a first priority parameter of a message to be conveyed over a peer-to-peer communication link to the second UE and a second priority parameter of a message to be conveyed over an uplink communication link to the base station. In some examples, the first UE may identify an updated threshold based on the first priority parameter and the second priority parameter and may compare the first priority parameter to the updated threshold to determine which message to transmit. In some other examples, the first UE may compare the first priority parameter and the second priority parameter directly and may determine which message to transmit based on the direct comparison of priorities. In some other examples, the base station may evaluate the first priority parameter and the second priority parameter and may configure the threshold that the UE uses to compare to the first priority via control signaling.

A method of wireless communication at a first UE is described. The method may include identifying a first message for a base station to be conveyed over a first communication link between the first UE and the base station using a transmission resource of the first UE, identifying a second message for a second UE to be conveyed over a second communication link between the first UE and the second UE using the transmission resource of the first UE, identifying a priority parameter associated with the first message, selecting one of the first message or the second message to transmit using the transmission resource based on the identifying of the priority parameter associated with the first message for the base station, and transmitting the selected one of the first message or the second message using the transmission resource of the first UE.

An apparatus for wireless communication at a first UE is described. The apparatus may include a processor, memory coupled with the processor, and instructions stored in the memory. The instructions may be executable by the processor to cause the apparatus to identify a first message for a base station to be conveyed over a first communication link between the first UE and the base station using a transmission resource of the first UE, identify a second message for a second UE to be conveyed over a second communication link between the first UE and the second UE using the transmission resource of the first UE, identify a priority parameter associated with the first message, select one of the first message or the second message to transmit using the transmission resource based on the identifying of the priority parameter associated with the first message for the base station, and transmit the selected one of the first message or the second message using the transmission resource of the first UE.

Another apparatus for wireless communication at a first UE is described. The apparatus may include means for identifying a first message for a base station to be conveyed over a first communication link between the first UE and the base station using a transmission resource of the first UE, identifying a second message for a second UE to be conveyed over a second communication link between the first UE and the second UE using the transmission resource of the first UE, identifying a priority parameter associated with the first message, selecting one of the first message or the second message to transmit using the transmission resource based on the identifying of the priority parameter associated with the first message for the base station, and transmitting the selected one of the first message or the second message using the transmission resource of the first UE.

A non-transitory computer-readable medium storing code for wireless communication at a first UE is described. The code may include instructions executable by a processor to identify a first message for a base station to be conveyed over a first communication link between the first UE and the base station using a transmission resource of the first UE, identify a second message for a second UE to be conveyed over a second communication link between the first UE and the second UE using the transmission resource of the first UE, identify a priority parameter associated with the first message, select one of the first message or the second message to transmit using the transmission resource based on the identifying of the priority parameter associated with the first message for the base station, and transmit the selected one of the first message or the second message using the transmission resource of the first UE.

Some examples of the method, apparatuses, and non-transitory computer-readable medium described herein may further include operations, features, means, or instructions for identifying a second priority parameter associated with the second message, where the selecting of the one of the first message or the second message may be based on the second priority parameter.

Some examples of the method, apparatuses, and non-transitory computer-readable medium described herein may further include operations, features, means, or instructions for receiving a grant message for the first message from the base station, where the identifying of the priority parameter may be based on receiving the grant message.

Some examples of the method, apparatuses, and non-transitory computer-readable medium described herein may further include operations, features, means, or instructions for identifying that the first message and the second message cannot both be transmitted from the first UE using the transmission resource, where the selecting of one of the first message or the second message may be based on the identifying that the first message and the second message cannot both be transmitted from the first UE using the transmission resource.

Some examples of the method, apparatuses, and non-transitory computer-readable medium described herein may further include operations, features, means, or instructions for modifying a threshold for comparing with a second priority parameter associated with the second message from a first value to a second value based on the priority parameter associated with the first message, and comparing the second priority parameter associated with the second message with the threshold having the second value based on the modifying of the threshold, where the selecting of the one of the first message or the second message may be based on comparing the second priority parameter with the threshold having the second value.

Some examples of the method, apparatuses, and non-transitory computer-readable medium described herein may further include operations, features, means, or instructions for identifying the second value of the threshold based on the priority parameter associated with the first message and the second priority parameter associated with the second message, where the modifying of the threshold to the second value may be based on the identifying of the second value.

Some examples of the method, apparatuses, and non-transitory computer-readable medium described herein may further include operations, features, means, or instructions for comparing the priority parameter associated with the first message with the second value of the threshold based on the identifying of the second value, where the modifying of the threshold may be based on the comparing of the priority parameter with the second value.

Some examples of the method, apparatuses, and non-transitory computer-readable medium described herein may further include operations, features, means, or instructions for determining that the priority parameter associated with the first message satisfies the second value of the threshold based on the identifying of the second value, where the modifying of the threshold to the second value may be based on the determining that the priority parameter satisfies the second value of the threshold.

Some examples of the method, apparatuses, and non-transitory computer-readable medium described herein may further include operations, features, means, or instructions for determining that the second priority parameter associated with the second message satisfies the second value of the threshold based on the comparing of the second priority parameter with the threshold, where the selecting of the one of the first message or the second message includes selecting the second message to transmit using the transmission resource of the first UE based on the determining that the second priority parameter satisfies the second value the threshold.

Some examples of the method, apparatuses, and non-transitory computer-readable medium described herein may further include operations, features, means, or instructions for determining that the second priority parameter associated with the second message fails to satisfy the second value of the threshold based on the comparing of the second priority parameter with the threshold, where the selecting of the one of the first message or the second message includes selecting the first message to transmit using the transmission resource of the first UE based on the determining that the second priority parameter fails to satisfy the second value the threshold.

Some examples of the method, apparatuses, and non-transitory computer-readable medium described herein may further include operations, features, means, or instructions for identifying a second value of a threshold for comparing with a second priority parameter associated with the second message different than a first value of the threshold currently used based on the priority parameter associated with the first message and the second priority parameter associated with the second message, determining that the priority parameter associated with the first message fails to satisfy the second value of the threshold based on the identifying of the second value, and maintaining the threshold at the first value based on the determining that the priority parameter fails to satisfy the second value.

Some examples of the method, apparatuses, and non-transitory computer-readable medium described herein may further include operations, features, means, or instructions for comparing the priority parameter associated with the first message with a second priority parameter associated with the second message, where the selecting of the one of the first message or the second message may be based on the comparing of the priority parameter with the second priority parameter.

Some examples of the method, apparatuses, and non-transitory computer-readable medium described herein may further include operations, features, means, or instructions for identifying the priority parameter associated with the first message, and identifying the second priority parameter associated with the second message, where the comparing of the priority parameter with the second priority parameter may be based on the identifying of the priority parameter and the second priority parameter.

Some examples of the method, apparatuses, and non-transitory computer-readable medium described herein may further include operations, features, means, or instructions for determining that the priority parameter may be greater than a second priority parameter associated with the second message, where the selecting of the one of the first message or the second message includes selecting the first message to transmit using the transmission resource of the first UE based on the determining that the priority parameter may be greater than the second priority parameter.

Some examples of the method, apparatuses, and non-transitory computer-readable medium described herein may further include operations, features, means, or instructions for determining that the priority parameter may be less than a second priority parameter associated with the second message, where the selecting of the one of the first message or the second message includes selecting the second message to transmit using the transmission resource of the first UE based on the determining that the priority parameter may be less than the second priority parameter.

A method of wireless communication at a first UE is described. The method may include receiving, from a base station, a value of a threshold for determining whether to send a first message or a second message using a transmission resource of the first UE, the first message to be conveyed over a first communication link between the first UE and the base station, the second message to be conveyed over a second communication link between the first UE and a second UE, where the value is based on a first priority parameter associated with the first message, modifying the threshold to the value based on the receiving of the value from the base station, comparing a second priority parameter associated with the second message with the threshold at the value based on the modifying of the threshold, selecting one of the first message or the second message to transmit using the transmission resource based on the comparing of the second priority parameter with the threshold, and transmitting the selected one of the first message or the second message using the transmission resource of the first UE.

An apparatus for wireless communication at a first UE is described. The apparatus may include a processor, memory coupled with the processor, and instructions stored in the memory. The instructions may be executable by the processor to cause the apparatus to receive, from a base station, a value of a threshold for determining whether to send a first message or a second message using a transmission resource of the first UE, the first message to be conveyed over a first communication link between the first UE and the base station, the second message to be conveyed over a second communication link between the first UE and a second UE, where the value is based on a first priority parameter associated with the first message, modify the threshold to the value based on the receiving of the value from the base station, compare a second priority parameter associated with the second message with the threshold at the value based on the modifying of the threshold, select one of the first message or the second message to transmit using the transmission resource based on the comparing of the second priority parameter with the threshold, and transmit the selected one of the first message or the second message using the transmission resource of the first UE.

Another apparatus for wireless communication at a first UE is described. The apparatus may include means for receiving, from a base station, a value of a threshold for determining whether to send a first message or a second message using a transmission resource of the first UE, the first message to be conveyed over a first communication link between the first UE and the base station, the second message to be conveyed over a second communication link between the first UE and a second UE, where the value is based on a first priority parameter associated with the first message, modifying the threshold to the value based on the receiving of the value from the base station, comparing a second priority parameter associated with the second message with the threshold at the value based on the modifying of the threshold, selecting one of the first message or the second message to transmit using the transmission resource based on the comparing of the second priority parameter with the threshold, and transmitting the selected one of the first message or the second message using the transmission resource of the first UE.

A non-transitory computer-readable medium storing code for wireless communication at a first UE is described. The code may include instructions executable by a processor to receive, from a base station, a value of a threshold for determining whether to send a first message or a second message using a transmission resource of the first UE, the first message to be conveyed over a first communication link between the first UE and the base station, the second message to be conveyed over a second communication link between the first UE and a second UE, where the value is based on a first priority parameter associated with the first message, modify the threshold to the value based on the receiving of the value from the base station, compare a second priority parameter associated with the second message with the threshold at the value based on the modifying of the threshold, select one of the first message or the second message to transmit using the transmission resource based on the comparing of the second priority parameter with the threshold, and transmit the selected one of the first message or the second message using the transmission resource of the first UE.

Some examples of the method, apparatuses, and non-transitory computer-readable medium described herein may further include operations, features, means, or instructions for identifying the second priority parameter associated with the second message, where the selecting of the one of the first message or the second message may be based on the identifying of the second priority parameter.

Some examples of the method, apparatuses, and non-transitory computer-readable medium described herein may further include operations, features, means, or instructions for determining that the second priority parameter associated with the second message satisfies the value of the threshold based on the comparing of the second priority parameter with the threshold, where the selecting of the one of the first message or the second message includes selecting the second message to transmit using the transmission resource of the first UE based on the determining that the second priority parameter satisfies the value of the threshold.

Some examples of the method, apparatuses, and non-transitory computer-readable medium described herein may further include operations, features, means, or instructions for determining that the second priority parameter associated with the second message fails to satisfy the value of the threshold based on the comparing of the second priority parameter with the threshold, where the selecting of the one of the first message or the second message includes selecting the first message to transmit using the transmission resource of the first UE based on the determining that the second priority parameter fails to satisfy the value the threshold.

In some examples of the method, apparatuses, and non-transitory computer-readable medium described herein, the receiving of the value may include operations, features, means, or instructions for receiving a control message that includes an indicator for the first UE to modify a current value of the threshold to the value.

In some examples of the method, apparatuses, and non-transitory computer-readable medium described herein, the receiving of the value may include operations, features, means, or instructions for receiving a control message that includes the value of the threshold.

In some examples of the method, apparatuses, and non-transitory computer-readable medium described herein, the receiving of the value may include operations, features, means, or instructions for receiving a control message that includes an indicator of the value of the threshold that the first UE uses to modify a current value of the threshold to the value.

In some examples of the method, apparatuses, and non-transitory computer-readable medium described herein, the receiving of the value may include operations, features, means, or instructions for receiving a medium access control (MAC) control element (MAC-CE) including an indicator associated with the value of the threshold.

In some examples of the method, apparatuses, and non-transitory computer-readable medium described herein, the receiving of the value may include operations, features, means, or instructions for receiving a downlink control information (DCI) including an indicator associated with the value of the threshold.

A method of wireless communication at a base station is described. The method may include identifying a first priority parameter associated with a first message to be conveyed over a first communication link between a first UE and the base station, identifying a value for a threshold for comparing with a second priority parameter associated with a second message to be conveyed over a second communication link between the first UE and a second UE based on the identifying of the first priority parameter, and transmitting the value of the threshold to the first UE based on the identifying of the value.

An apparatus for wireless communication at a base station is described. The apparatus may include a processor, memory coupled with the processor, and instructions stored in the memory. The instructions may be executable by the processor to cause the apparatus to identify a first priority parameter associated with a first message to be conveyed over a first communication link between a first UE and the base station, identify a value for a threshold for comparing with a second priority parameter associated with a second message to be conveyed over a second communication link between the first UE and a second UE based on the identifying of the first priority parameter, and transmit the value of the threshold to the first UE based on the identifying of the value.

Another apparatus for wireless communication at a base station is described. The apparatus may include means for identifying a first priority parameter associated with a first message to be conveyed over a first communication link between a first UE and the base station, identifying a value for a threshold for comparing with a second priority parameter associated with a second message to be conveyed over a second communication link between the first UE and a second UE based on the identifying of the first priority parameter, and transmitting the value of the threshold to the first UE based on the identifying of the value.

A non-transitory computer-readable medium storing code for wireless communication at a base station is described. The code may include instructions executable by a processor to identify a first priority parameter associated with a first message to be conveyed over a first communication link between a first UE and the base station, identify a value for a threshold for comparing with a second priority parameter associated with a second message to be conveyed over a second communication link between the first UE and a second UE based on the identifying of the first priority parameter, and transmit the value of the threshold to the first UE based on the identifying of the value.

In some examples of the method, apparatuses, and non-transitory computer-readable medium described herein, the transmitting of the value may include operations, features, means, or instructions for transmitting a control message that includes an indicator for the first UE to modify a current value of the threshold to the value.

In some examples of the method, apparatuses, and non-transitory computer-readable medium described herein, the transmitting of the value may include operations, features, means, or instructions for transmitting a control message that includes the value of the threshold.

In some examples of the method, apparatuses, and non-transitory computer-readable medium described herein, the transmitting of the value may include operations, features, means, or instructions for transmitting a control message that includes an indicator of the value of the threshold that the first UE uses to modify a current value of the threshold to the value.

In some examples of the method, apparatuses, and non-transitory computer-readable medium described herein, the transmitting of the value may include operations, features, means, or instructions for transmitting a MAC-CE including an indicator associated with the value of the threshold.

In some examples of the method, apparatuses, and non-transitory computer-readable medium described herein, the transmitting of the value may include operations, features, means, or instructions for transmitting a DCI including an indicator associated with the value of the threshold.

DETAILED DESCRIPTION

Figure 1:
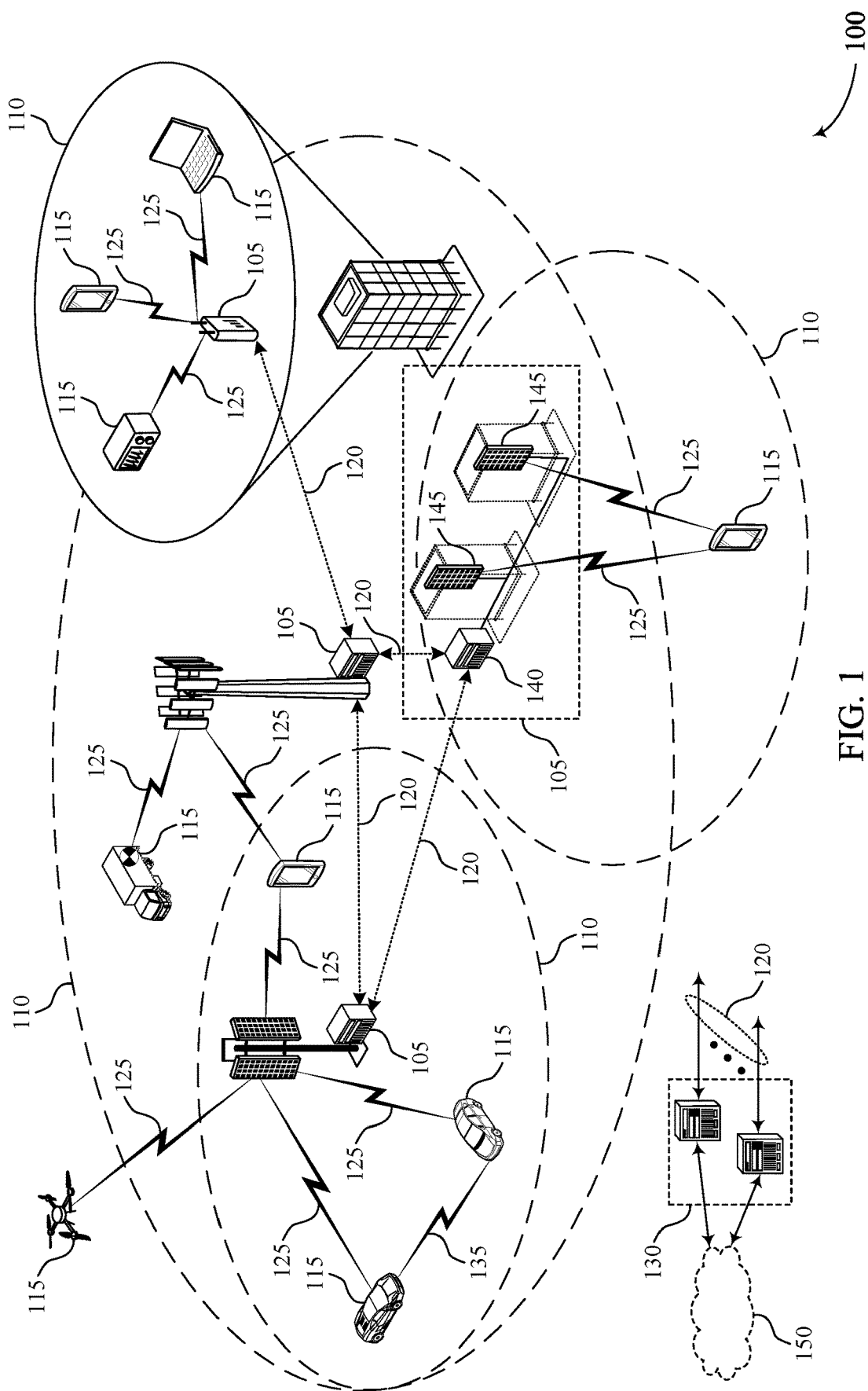
FIG. 1 illustrates an example of a wireless communications system that supports prioritization techniques between communication links in accordance with aspects of the present disclosure.

As demand for communication resources increases due to an increasing quantity of wireless devices communicating over the available spectrum, techniques to efficiently and reliably increase throughput are desirable. For example, some wireless communications systems may allow a first user equipment (UE) to communicate with a base station over a first communication link (e.g., an access link or a Uu link) and to communicate directly with a second UE over a second communication link (e.g., a sidelink or an SL link). These two independent communication links may create collisions or conflicts at the first UE in cases in which the first UE is scheduled to transmit messages to both the base station and the second UE over their respective communication links at the same time. If such collisions or conflicts occur, the first UE may utilize one or more prioritization techniques to select one of the conflicting messages to send. In some cases, prioritization techniques that facilitate collision-avoidance at the first UE between access link and sidelink messages may consider a priority parameter of the message associated with the sidelink, but may fail to consider a priority parameter of the message associated with the access link.

In some implementations of the present disclosure, the first UE to determine whether to send a first message to the base station over the first communication link (e.g., an access link) or a second message to the second UE over the second communication link (e.g., a sidelink) using both a first priority parameter associated with the first message of the access link and a second priority parameter associated with the second message of the sidelink. In some examples, the first UE may identify an updated threshold based on the first priority parameter and the second priority parameter and compare the second priority parameter of the second message associated with the sidelink to the updated threshold to determine which message to transmit. In some other examples, the first UE may compare the first priority parameter and the second priority parameter directly and may determine which message to transmit based on the direct comparison of priorities. In some other examples, the base station may evaluate the first priority parameter and the second priority parameter and configure the threshold that the UE uses to compare to the second priority parameter of the second message associated with the sidelink using control signaling.

Particular aspects of the subject matter described in this disclosure can be implemented to realize one or more of the following potential advantages. In some examples, the described techniques may be implemented to achieve improved prioritization of signaling across various communication links, including across access links and sidelinks. For instance, in scenarios in which the first UE is scheduled for simultaneous transmission of different messages to the base station and the second UE, the first UE may efficiently prioritize the different messages based on implementing the described techniques for direct or indirect comparisons between the respective priorities of the different messages. As such, the first UE may more reliably satisfy latency-critical timelines for communications across various communication links, which may result in lower latency, higher data rates, and greater capacity, among other benefits.

Aspects of the disclosure are initially described in the context of wireless communications systems. Aspects of the disclosure are additionally described in the context of process flows illustrating example communication flows. Aspects of the disclosure are further illustrated by and described with reference to apparatus diagrams, system diagrams, and flowcharts that relate to prioritization techniques between communication links.

FIG. 1 illustrates an example of a wireless communications system 100 that supports prioritization techniques between communication links in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some cases, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive scheduling information that schedules a first message to a base station 105 over a communication link 125 (which may be an example of an access link or a Uu link) and, concurrently, the UE 115 may identify a second message to transmit to another UE 115 over a communication link 135 (which may be an example of a sidelink). In some cases, the transmission resources the UE 115 may use to transmit the first message and the second message may partially or completely overlap during a time interval (e.g., during one or more TTIs) such that the UE 115 may be scheduled to communicate both of the first message and the second message concurrently. The UE 115, however, may be unable to concurrently communicate the first message over the communication link 125 and the second message over the communication link 135 (e.g., based on a capability of the UE 115). In such cases, the UE 115 may select to communicate either the first message or the second message (and may drop or delay transmission of the non-selected one of the first message or the second message).

In some examples, the UE 115 may select the first message or the second message based on the relative priorities of the first message and the second message. For example, the UE 115 may identify that the first message may be associated with a first priority and that the second message may be associated with a second priority and the UE 115 may select to transmit the message that is associated with the higher priority. In some aspects, the UE 115 may identify the first priority and the second priority based on a first priority parameter associated with the first message or the channel carrying the first message and a second priority parameter associated with the second message or a channel carrying the second message, respectively.

In some implementations, the UE 115 may compare the first priority to a threshold that the UE 115 may use to determine whether to transmit the first message or the second message. In examples in which the first priority is greater than the threshold, the UE 115 may update the threshold to a new value based on the first priority. Alternatively, in examples in which the first priority is less than the threshold, the UE 115 may maintain the original threshold. In such implementations, the UE 115 may compare the second priority to the threshold (e.g., the updated threshold or the original threshold based on whether the first priority exceeded the original threshold) to determine whether to transmit the first message or the second message. Additionally or alternatively, the UE 115 may compare (e.g., directly compare) the first priority and the second priority to determine whether to transmit the first message or the second message. Additionally or alternatively, the UE 115 may receive, from the base station 105, an indication of a value of a threshold that the UE 115 may use to determine whether to transmit the first message or the second message. In some examples, the UE 115 may modify a preconfigured threshold based on dynamically receiving the value of the threshold from the base station 105 and may determine to transmit the first message or the second message based on comparing one or both of the priorities to the threshold. In some examples, the UE may receive the indication of the threshold via a control message, downlink control information (DCI), a MAC control element (MAC-CE), or the like. The control message, DCI, or MAC-CE may include the value of the threshold or an indicator associated with the value of the threshold that the UE may use to identify the threshold (e.g., in a preconfigured table at the UE).

Figure 2:
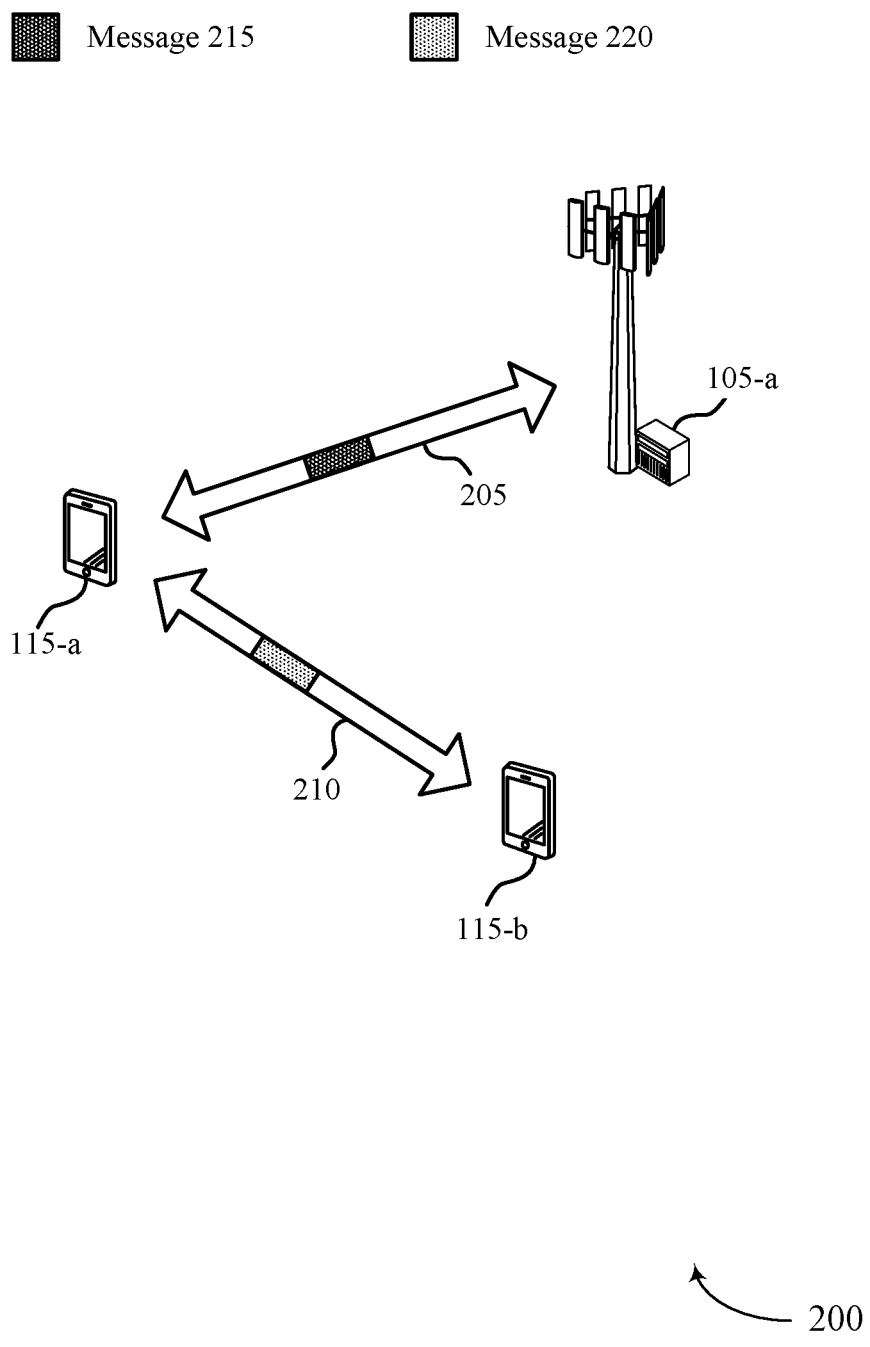
FIG. 2 illustrates an example of a wireless communications system that supports prioritization techniques between communication links in accordance with aspects of the present disclosure.

FIG. 2 illustrates an example of a wireless communications system 200 that supports prioritization techniques between communication links in accordance with aspects of the present disclosure. In some examples, the wireless communications system 200 may implement aspects of wireless communications system 100. In some examples, the wireless communications system 200 may include a UE 115-a, a UE 115-b, and a base station 105-a, which may be examples of UEs 115 and a base station 105 as described with reference to FIG. 1. However, the techniques described herein may be implemented by any wireless devices communicating over one or more communication links, such as a relay device or a node.

The UE 115-a may communicate with the base station 105-a via a communication link 205, which may be an example of an NR link between the UE 115-a and the base station 105-a. In some cases, the communication link 205 may be an example of an access link (e.g., a Uu link). The communication link 205 may be a bi-directional link that carries both uplink and downlink communication. For example, the UE 115-a may transmit uplink signals, such as uplink control signals or uplink data signals, to the base station 105-a via the communication link 205 and the base station 105-a may similarly transmit downlink signals, such as downlink control signals or downlink data signals, to the UE 115-a via the communication link 205.

Additionally, the UE 115-a and the UE 115-b may support sidelink communication capabilities and may communicate via a communication link 210, which may be an example of an NR link between the UE 115-a and the UE 115-b. In some cases, the communication link 210 may be an example of a sidelink (e.g., an SL link). For example, the communication link 210 may be an example of a D2D link, a peer-to-peer link, a relay link, a private network link, an industrial IoT communication link, or any other similar communication link between peer devices. In some cases, the UE 115-a may be a part of a broader network of UEs 115 (e.g., a mesh network) and may be configured as a relay that retransmits signals on behalf other devices, such as other UEs 115 or base stations 105. In some aspects, communications over the communication link 205 may use different time resources, different frequency resources, different directional beams, or any combination thereof than communications over the communication link 210. In some examples, the wireless communications system 200 may be configured to support improved prioritization techniques between transmissions over one or more communication links, such as the communication link 205 and the communication link 210.

In some cases, the UE 115-a may be scheduled to communicate (e.g., transmit or receive) multiple messages on multiple communication links (e.g., both of the communication link 205 and the communication link 210) using the same transmission resources or using at least partially overlapping transmission resources. For example, the UE 115-a may be scheduled to communicate a message 215 via the communication link 205 (e.g., the access link or Uu link) and a message 220 via the communication link 210 (e.g., the sidelink or SL link) using a same time resource (e.g., during a common transmission interval). Transmission resources of a UE 115 may refer to or otherwise involve the operation of any hardware, firmware, or software used by the UE to facilitate communication (e.g., a transmit chain of the UE). In some examples, UEs 115 may use the same transmit chain or processing resources to communicate different messages on different communication resources. In such examples, the UE 115-a may be unable to communicate the message 215 and the message 220 at the same time, even in examples in which the message 215 and the message 220 may be communicated over different frequency resources. As such, the UE 115-a may employ one or more prioritization rules to determine which message to communicate.

Alternatively, the UE 115-a may be able to communicate the message 215 and the message 220 during the common transmission interval but may nonetheless prioritize the communication link 205 or the communication link 210 for various other reasons. For example, in some cases, the message 215 may be carried by a first logical channel (LCH) associated with the communication link 205 and the message 220 may be carried by a second LCH associated with the communication link 210, where the first LCH and the second LCH may be associated with different priorities. Accordingly, the UE 115-a may transmit either the message 215 or the message 220 depending on which of the message 215 or the message 220 is associated with a higher priority (e.g., depending on which of the first LCH and the second LCH is associated with the higher priority).

The UE 115-a may use a threshold (e.g., an RRC configured threshold) to determine whether to transmit the message 215 or the message 220. In some cases, the UE 115-a may be configured with a set of available threshold values and may receive RRC signaling that indicates one threshold value of the set of available threshold values. In such cases, the UE 115-a may compare the priority of the message 220 scheduled for transmission using the communication link 210 (e.g., the sidelink) to the selected threshold value to determine whether to communicate the message 215 or the message 220. Accordingly, if the UE 115-a determines that the priority of the message 220 is satisfies the threshold value, the UE 115-a may select to communicate the message 220 using the transmission resources and may refrain from communicating the message 215. Alternatively, if the UE 115-a determines that the priority of the message 220 is does not satisfy the threshold value, the UE 115-a may communicate the message 215 using the transmission resources and may refrain from communicating the message 220.

In some cases, the UE 115-a may determine whether to communicate the message 215 (e.g., associated with the access link) or the message 220 (e.g., associated with the sidelink) without considering the priority of the message 215. This may result in erroneous prioritization in cases in which there is a discrepancy between the configured threshold and the priority of the message 215. For example, the threshold may become out of date relative to the priority of the message 215, such that, even in examples in which the priority of the message 220 is greater than the threshold, the priority of the message 215 may still be greater than the priority of the message 220.

Further, the UE 115-a may be unable to compare the priority of the message 215 to the value of the threshold or the priority of the message 220. For example, a priority parameter associated with a message 215 may be incompatible (e.g., incomparable) with a value of the configured threshold and a priority parameter associated with the message 220 such that there is no direct correspondence between the priority parameters associated with the messages carried via the different communication links (e.g., different channels on the different communication links may be associated with different, incompatible types of priority parameters). For instance, the UE 115-a may receive an indication of the priority parameter associated with the message 215 in a Uu grant, but the priority parameter as provided by the Uu grant (e.g., a priority parameter associated with a Uu channel) may be incompatible with the RRC configured threshold or the identified priority parameter associated with the message 220 (e.g., a priority parameter associated with a sidelink channel).

In some implementations of the techniques described herein, the UE 115-a may employ a prioritization procedure for determining whether to communicate the message 215 or the message 220 by accounting for the priorities of both the message 215 and the message 220. In some examples, the UE 115-a may support a mapping operation to enable a correspondence (e.g., a direct correspondence or a direct mapping) between the priority parameter of the message 215 conveyed by the communication link 205 and the priority parameter of the message 220 conveyed by the communication link 210, which may support direct and indirect comparisons between the relative priorities of the message 215 and the message 220. Additionally or alternatively, the described techniques may support receiving one or more dynamically transmitted indications of a threshold value from the base station 105-a that the UE 115-a may use to determine which message to communicate. In such examples, the base station 105-a may more frequently adapt the threshold to the priority of the message 215 conveyed over the communication link 205.

Figure 3:
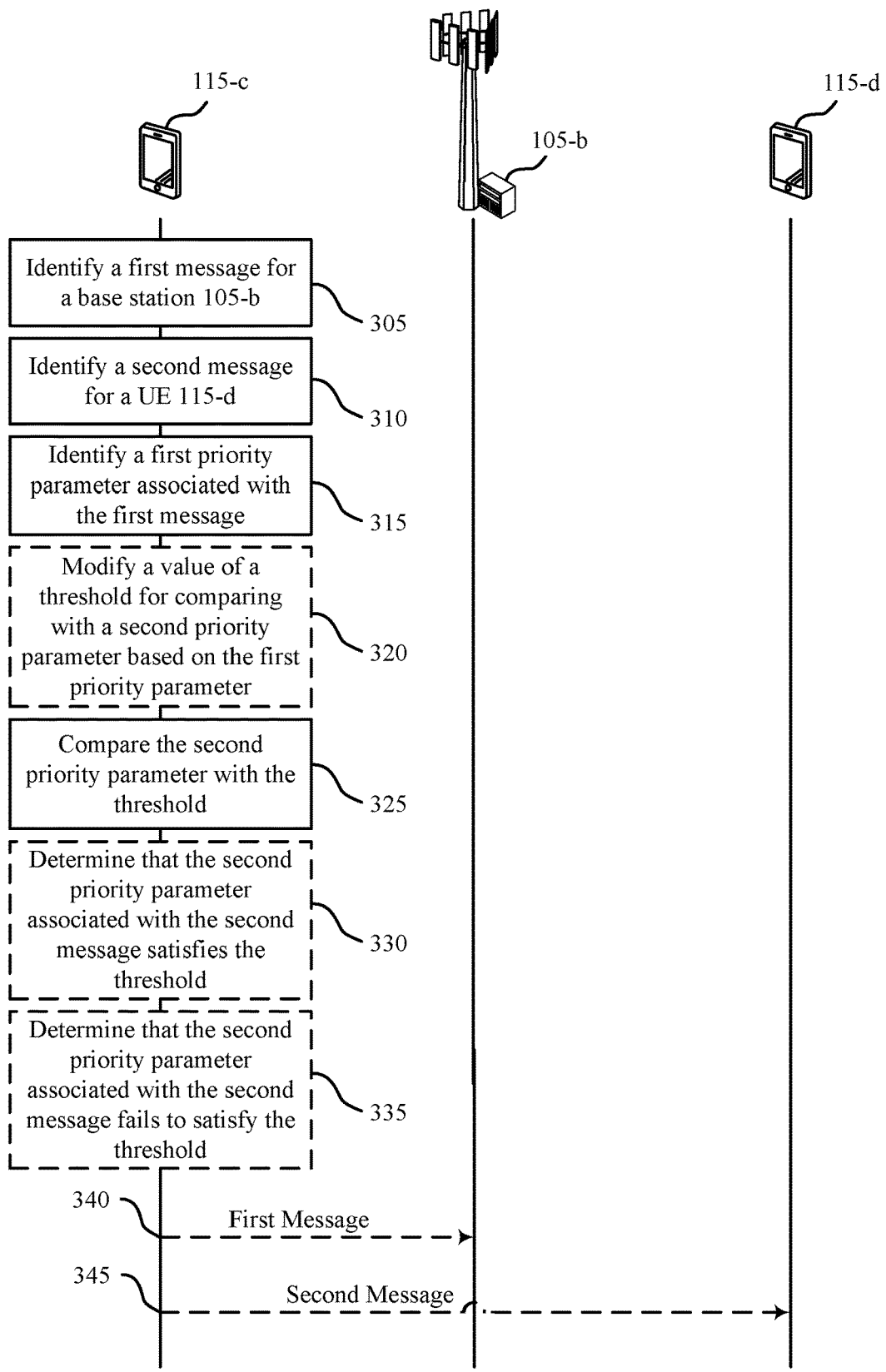
FIG. 3 illustrates an example of a process flow that supports prioritization techniques between communication links in accordance with aspects of the present disclosure.

FIG. 3 illustrates an example of a process flow 300 that supports prioritization techniques between communication links in accordance with aspects of the present disclosure. In some examples, the process flow 300 may implement aspects of the wireless communications system 100 or the wireless communications system 200. The process flow 300 may include a UE 115-c, a UE 115-d, and a base station 105-b, which may be examples of corresponding devices as described herein. In some examples, the operations illustrated in the process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

In some examples, the UE 115-c may support a mapping operation that may enable the UE 115-c to indirectly compare the priorities (e.g., the priority parameters) associated with a first message and a second message that are scheduled for the same transmission resources or at least partially overlapping transmission resources (e.g., fully or partially overlapping time resources). For example, the UE 115-c may support a mapping between the priorities associated with messages of the access link and messages of the sidelink to determine an updated value for the threshold. In some other examples, the UE 115-c may support a mapping between a priority of a message to be conveyed to the base station 105-b over the access link and values of the threshold that is configured for comparisons with the priority of a message to be conveyed to the UE 115-d over the sidelink. Based on the mapping, the UE 115-c may identify a new value (different than a current value) of the threshold. The UE 115-c may obtain a value of a threshold based on the priority parameter of the LCHs on the Uu link, and such value of the threshold may be compared with the priority parameter of the LCHs on the sidelink. For example, the UE 115-c may obtain an equivalent threshold (e.g., a sidelink-Uu link equivalent threshold) based on the mapping and the UE 115-c may compare the equivalent threshold to the configured threshold.

At 305, the UE 115-c may identify a first message for transmission to the base station 105-b that may be conveyed over the first communication link between the UE 115-c (which may be referred to as a first UE) and the base station 105-b. In some cases, the first communication link be an NR Uu link. In some examples, the UE 115-c may identify that the first message is scheduled for a transmission resource of the UE 115-c. The transmission resource may include or refer to a time resource for the first message, such as one or more transmission intervals or one or more TTIs.

At 310, the UE 115-c may identify a second message for transmission to the UE 115-d that may be conveyed over the second communication link between the UE 115-c and the UE 115-d (which may be referred to as a second UE). In some cases, the second communication link may be a sidelink. In some examples, the UE 115-c may identify that the second message is scheduled for the same transmission resource as the first message or for at least partially overlapping transmission resources of the first message. Accordingly, the UE 115-c may determine that the first message and the second message may be scheduled for transmission at the same time or during at least partially overlapping transmission intervals.

At 315, the UE 115-c may identify a priority parameter associated with the first message. The priority parameter may be referred to as a first priority parameter and may be associated with a first priority of the first message. In some cases, the UE 115-c may receive a grant message from the base station 105-b that may schedule the first message and that may also provide an indication of the priority parameter associated with the first message. In some cases, the UE 115-c may additionally identify a priority parameter, which may be referred to as a second priority parameter, associated with the second message.

At 320, the UE 115-c may, in some examples, modify a value of a threshold (e.g., a configured threshold) for comparing with the second priority parameter associated with the second message based at least in part on the first priority parameter associated with the first message. In some cases, the threshold may be modified from a first value to a second value based on the first priority parameter.

In some examples, the UE 115-c may identify a candidate of a new value for the threshold based on a mapping between the first priority parameter of the first message (e.g., associated with access link) and the second priority parameter of the second message (e.g., associated with the sidelink). In some aspects, the UE 115-c may receive an indication of the mapping from the base station 105-b. Once the candidate of the new value is identified, the UE 115-c may compare the first priority parameter of the first message (e.g., associated with access link) with the candidate of the new value. If the first priority satisfies the candidate for the new value, the UE 115-c may update the threshold to be the new value. If the first priority fails to satisfy the candidate for the new value, the UE 115-c may maintain the threshold at its current value. As such, the UE 115-c may compare the second priority parameter of the second message (e.g., associated with the sidelink) with the value of the threshold (whether the newer value or the older, original value), and may select which message to send based on whether the second priority parameter satisfies the threshold or not, as described in more detail with reference to 325. For example, if the second priority satisfies the threshold, the UE 115-c may select to send the second message using the transmission resources. If the second priority fails to satisfy the threshold, the UE 115-c may select to send the first message using the transmission resources. In some cases, the UE 115-c may determine whether to update the value of the threshold for each collision occasion. After a collision occasion has been resolved, the value of the threshold may revert back it its configured value or stay at its the current value.

In some implementations, the UE 115-*c* may modify the threshold based on whether the first priority parameter is greater than or less than a value of the threshold. For instance, in examples in which the first priority parameter is greater than the threshold, the UE 115-*c* may modify the threshold from the first value (e.g., an original value of the threshold configured via RRC signaling) to the second value. In some aspects, the second value may be equal or approximate to the first priority parameter. For example, in examples in which the first priority parameter is greater than the threshold, the UE 115-*c* may modify the threshold to match or approximately match the first priority parameter (e.g., the priority of the first message). In some examples, the UE 115-*c* may modify the threshold for the duration of the time interval during which the first message and the second message overlap (e.g., conflict or collide). Accordingly, the UE 115-*c* may adjust the threshold back to the originally configured value of the threshold (e.g., the first value) after the time interval during which the first message and the second message overlap. As such, the modified threshold may be valid for the single collision occasion of the first message and the second message, which may be because priorities (e.g., the Uu grant priority) may change from one collision occasion to the next. Alternatively, in examples in which the first priority parameter is less than or equal to the threshold, the UE 115-*c* may refrain from modifying the threshold (e.g., the threshold may remain at the first value or the original value).

In some examples, the first priority parameter associated with the first message may initially be incompatible (e.g., incomparable) with the threshold and, likewise, the second priority parameter associated with the second message. To reconcile the incompatibility between the first priority parameter and the second priority parameter, the UE 115-*c* may identify a mapping between the value of the threshold and the first priority parameter. In some aspects, the UE 115-*c* may receive an indication of the mapping from the base station 105-*b*. For example, the base station 105-*b* may transmit an indication of the mapping (e.g., a mapping table or chart) or explicitly transmit the mapping that the UE 115-*c* may use to map the first priority parameter associated with the first message to the value of the threshold (e.g., to map or convert the first priority parameter indicated in the Uu grant to the value of the threshold). In examples in which the base station 105-*b* transmits an indication of the mapping, the UE 115-*c* may identify the indication and determine to use a mapping from a quantity of mappings configured at the UE 115-*c* based on the indication. In some aspects, the base station 105-*b* may transmit an indication of multiple mappings (e.g., multiple mapping tables or charts) that the UE 115-*c* may use to map or convert different priority parameters such that the different priority parameters become compatible with each other. In some other examples, the UE 115-*c* may identify a mapping configured at the UE 115-*c* without signaling from the base station 105-*b*. For instance, the UE 115-*c* may identify and use a mapping between different priority parameters based on a preconfigured mapping or a mapping defined in a specification.

The UE 115-*c*, using the identified mapping, may map (e.g., correlate, convert, etc.) the value of the first priority parameter to a value that may directly correspond or map to the threshold and, likewise, the second priority parameter.

Upon mapping the first priority parameter to the value that is comparable with the threshold, the UE 115-*c* may compare the mapped or converted value of the first priority parameter (which may be referred to as a sidelink-Uu equivalent threshold) to the value of the threshold and may determine whether to modify the threshold or maintain the original threshold (e.g., the RRC configured threshold) based on the comparison.

Such examples for modifying the value of the threshold describe possible implementations of the present disclosure, and the described operations may be rearranged or otherwise modified or other implementations may be used without exceeding the scope of the present disclosure. Further, aspects from two or more of the examples outlined herein may be combined or rearranged.

At 325, the UE 115-*c* may compare the second priority parameter with the threshold at its value (whether a configured value or whether an updated value). For instance, in examples in which the mapped or converted value of the first priority parameter satisfies the threshold, the UE 115-*c* may compare the second priority parameter to the modified value of the threshold. Alternatively, in examples in which the mapped or converted value of the first priority parameter fails to satisfy the threshold, the UE 115-*c* may compare the second priority parameter to the originally configured value of the threshold.

Although steps 320 and 325 are described in the context of modifying the threshold based on a comparison with the first priority parameter and comparing the potentially modified threshold to the second priority parameter to determine whether to select the first message or the second message, the operations at 320 and 325 may be similarly implemented in a different order (e.g., the reverse order). For example, at 320, the UE 115-*c* may modify the threshold based on determining whether the second priority is greater than or less than the threshold. Accordingly, at 325, the UE 115-*c* may compare the first priority parameter to the potentially modified threshold (based on employing the mapping) and may determine whether to select the first message or the second message based on comparing the first priority parameter associated with the first message to the potentially modified threshold. In such examples, the UE 115-*c* may similarly implement a mapping between the first priority parameter, the threshold, and the second priority parameter to enable a direct mapping or correspondence between the different priority parameters and the threshold.

At 330, the UE 115-*c* may, in some examples, determine that the second priority parameter associated with the second message satisfies the threshold based on comparing the second priority parameter with the threshold. For example, the UE 115-*c* may determine that the second priority parameter is greater than the threshold (e.g., either the modified threshold or the originally configured threshold) and may likewise determine that the second message is associated with a higher priority than the first message. Accordingly, the UE 115-*c* may select the second message for transmission using the transmission resource of the UE 115-*c*.

Alternatively, at 335, the UE 115-*c* may determine that the second priority parameters associated with the second message fails to satisfy the threshold. For example, the UE 115-*c* may determine that the second priority parameter is less than the threshold (e.g., either the modified threshold or the originally configured threshold) and may likewise determine that the first message is associated with a higher priority than the second message. Accordingly, the UE 115-*c* may select the first message for transmission using the transmission resource of the UE 115-*c*. In some examples, the second priority parameter (or the first priority parameter in the case that the first priority parameter is compared to the threshold) may be equal to the value of the threshold. In such examples, the UE 115-c may determine to prioritize the first message using the first communication link (e.g., the UE 115-c may prioritize traffic on a Uu link in the event of a tie) or the UE 115-c may determine to prioritize the second message on the second communication link (e.g., the UE 115-c may prioritize traffic on a sidelink in the event of a tie). In some implementations, the UE 115-c may be configured to prioritize one communication link over the other in examples in which respective priorities are the same based on a default configuration of the UE 115-c.

At 340, the UE 115-c may optionally transmit the first message to the base station 105-b using the transmission resource of the UE 115-c via the first communication link. The UE 115-c may transmit the first message to the base station 105-b in examples in which the UE 115-c determines that the second priority parameter fails to satisfy the threshold at 335.

At 345, the UE 115-c may optionally transmit the second message to the UE 115-d using the transmission resource of the UE 115-c and the second communication link. The UE 115-c may transmit the second message to the base station 105-b in examples in which the UE 115-c determines that the second priority parameter satisfies the threshold at 330.

Figure 4:
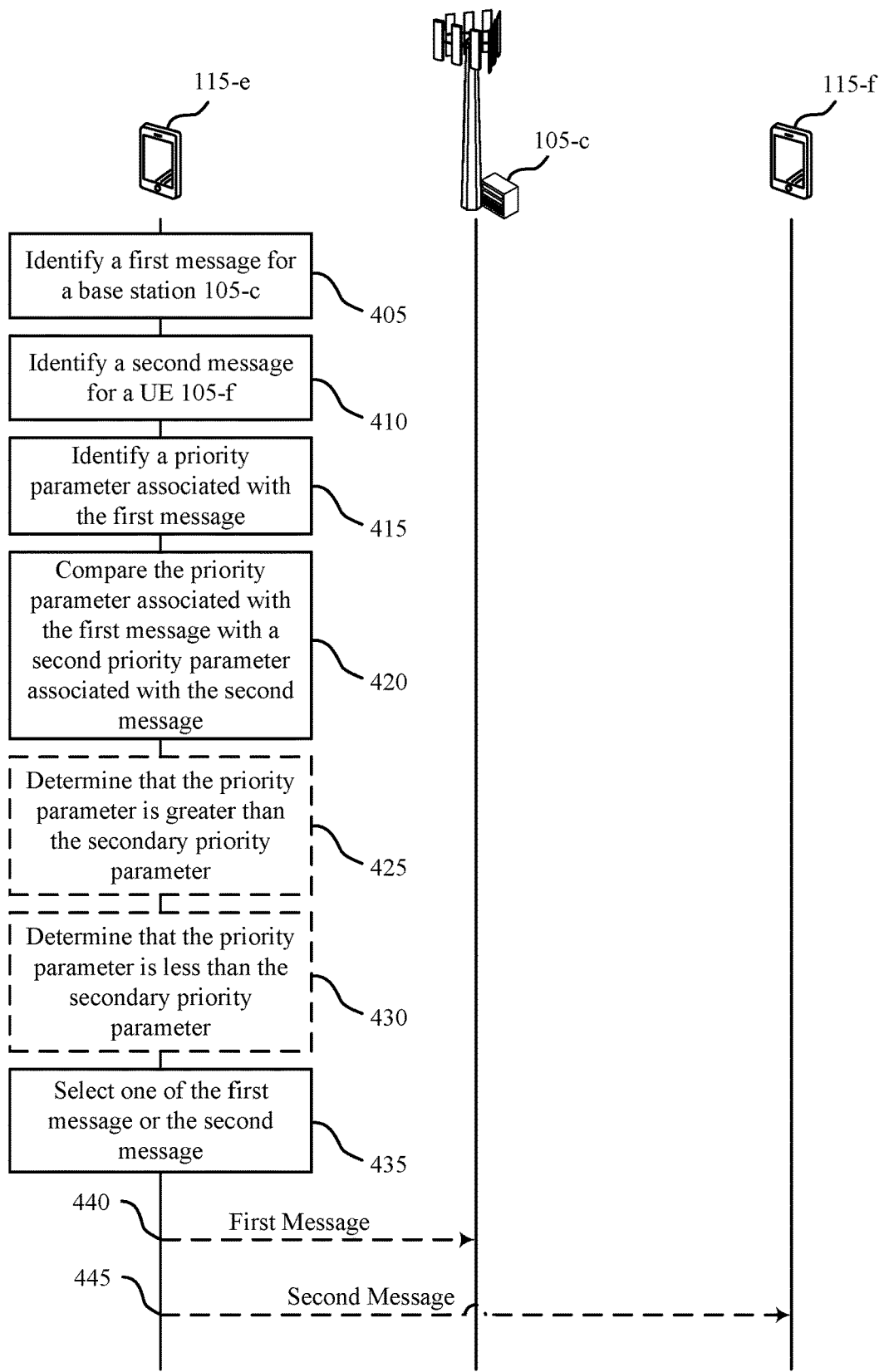
FIG. 4 illustrates an example of a process flow that supports prioritization techniques between communication links in accordance with aspects of the present disclosure.

FIG. 4 illustrates an example of a process flow 400 that supports prioritization techniques between communication links in accordance with aspects of the present disclosure. In some examples, the process flow 400 may implement aspects of the wireless communications system 100 or the wireless communications system 200. The process flow 400 may include a UE 115-e, a UE 115d, and a base station 105-c, which may be examples of corresponding devices as described herein. In some examples, the operations illustrated in the process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

In some examples, the UE 115-e may support a mapping operation that may enable the UE 115-c to directly compare the priorities (e.g., the priority parameters) associated with a first message and a second message that are scheduled for transmission intervals using the same transmission resources or for at least partially overlapping transmission resources (e.g., fully or partially overlapping time resources). For example, the UE 115-e may support a mapping operation that may enable the UE 115-e to directly compare a first priority parameter associated with the first message and a second priority parameter associated with the second message (e.g., the mapping operation may enable a direct correspondence between the different priority parameters associated with the different messages and the different communication links). In some specific examples, the mapping may support a direct comparison between a priority associated with an LCH on a sidelink and a priority associated with an LCH on an NR Uu link.

At 405, the UE 115-e may identify a first message for transmission to the base station 105-c that may be conveyed over the first communication link between the UE 115-e (which may be referred to as a first UE) and the base station 105-c. In some cases, the first communication link be an NR Uu link. In some examples, the UE 115-e may identify that the first message is scheduled for a transmission resource of the UE 115-e. The transmission resource may include or refer to a time resource for the first message, such as one or more transmission intervals or one or more TTIs.

At 410, the UE 115-e may identify a second message for transmission to the UE 115-f that may be conveyed over the second communication link between the UE 115-e and the UE 115-f (which may be referred to as a second UE). In some cases, the second communication link may be a sidelink. In some examples, the UE 115-e may identify that the second message is scheduled for the same transmission resource as the first message or for at least partially overlapping transmission resources of the first message. Accordingly, the UE 115-e may determine that the first message and the second message may be scheduled for transmission at the same time or during at least partially overlapping transmission intervals.

At 415, the UE 115-e may identify a priority parameter associated with the first message. The priority parameter may be referred to as a first priority parameter and may be associated with a first priority of the first message. In some cases, the UE 115-e may receive a grant message (e.g., a Uu grant) from the base station 105-c that may schedule the first message and may also provide an indication of the first priority parameter associated with the first message.

At 420, the UE 115-e may compare the first priority parameter associated with the first message with a second priority parameter associated with the second message. In some implementations, the UE 115-e may directly compare the first priority parameter associated with the first message with the second priority parameter associated with the second message to determine whether the first message or the second message is associated with a higher priority.

In some cases, as described herein, the first priority parameter associated with the first message may initially be incompatible (e.g., incomparable or inapplicable) with the second priority parameter associated with the second message. As such, in some implementations of the present disclosure, the UE 115-e may identify a mapping between the first priority parameter and the second priority parameter such that the UE 115-e may directly compare the first priority parameter with the second priority parameter based on employing the mapping. In some examples, the UE 115-e may receive an indication of the mapping from the base station 105-c. For example, the base station 105-c may transmit an indication of the mapping (e.g., a mapping table or chart) or explicitly transmit the mapping that the UE 115-e may use to map the first priority parameter to the second priority parameter. In examples in which the base station 105-c transmits an indication of the mapping, the UE 115-e may identify the indication and determine to use a mapping from a quantity of mappings configured at the UE 115-e based on the indication. In some other examples, the UE 115-e may identify a mapping configured at the UE 115-e without signaling from the base station. For instance, in some specific examples, the UE 115-e may identify and use a mapping between different priority parameters based on a preconfigured mapping or a mapping defined in a specification.

The UE 115-e, using the identified mapping, may map (e.g., correlate, convert, etc.) a value of the first priority parameter to a value that may directly correspond or map to a value of the second priority parameter (in terms or in a manner of matching the units of the two priorities). Based on mapping the first priority parameter to the value that is comparable with the second priority parameter, the UE 115-*e* may compare the mapped value of the first priority parameter to the second priority parameter and determine which of the first message or the second message is associated with the higher priority. Alternatively, the UE 115-*e* may use the identified mapping to map (e.g., correlate, convert, etc.) a value of the second priority parameter to a value that may directly correspond or map to a value of the first priority parameter. Accordingly, the UE 115-*e* may compare the mapped value of the second priority parameter to the first priority parameter and determine which of the first message or the second message is associated with the higher priority.

At 425, the UE 115-*e* may, in some examples, determine that the priority parameter associated with the first message (e.g., the first priority parameter) is greater than the second priority parameter associated with the second message. For example, based on directly comparing the first priority parameter and the second priority parameter using the mapping, the UE 115-*e* may determine that the first priority parameter is greater than the second priority parameter and, accordingly, may determine that the first message is associated with a higher priority than the second message.

Alternatively, at 430, the UE 115-*e* may determine that the priority parameter associated with the first message (e.g., the first priority parameter) is less than the second priority parameter associated with the second message. For example, based on directly comparing the first priority parameter and the second priority parameter using the mapping, the UE 115-*e* may determine that the second priority parameter is greater than the first priority parameter and, accordingly, may determine that the second message is associated with a higher priority than the first message.

In some examples, the first priority parameter may be equal to the second priority parameter. In such examples, the UE 115-*e* may determine to prioritize the first message using the first communication link (e.g., the UE 115-*e* may prioritize traffic on a Uu link in the event of a tie) or the UE 115-*e* may determine to prioritize the second message on the second communication link (e.g., the UE 115-*e* may prioritize traffic on a sidelink in the event of a tie). In some implementations, the UE 115-*e* may be configured to prioritize one communication link over the other in examples in which respective priorities are the same based on a default configuration of the UE 115-*e*.

At 435, the UE 115-*e* may select one of the first message or the second message to transmit using the transmission resource of the UE 115-*e*. In some examples, the UE 115-*e* may select either the first message or the second message based on the results of the comparison between the first priority parameter and the second priority parameter.

At 440, the UE 115-*e* may optionally transmit the first message to the base station 105-*c* using the transmission resource of the UE 115-*e* via the first communication link. In some examples, the UE 115-*e* may transmit the first message to the base station 105-*c* in examples in which the UE 115-*e* determines that the first priority parameter is greater than the second priority parameter.

At 445, the UE 115-*e* may optionally transmit the second message to the base station 105-*c* using the transmission resource of the UE 115-*e* and the second communication link. In some examples, the UE 115-*e* may transmit the second message to the base station 105-*c* in examples in which the UE 115-*e* determines that the first priority parameter is less than the second priority parameter.

Figure 5:
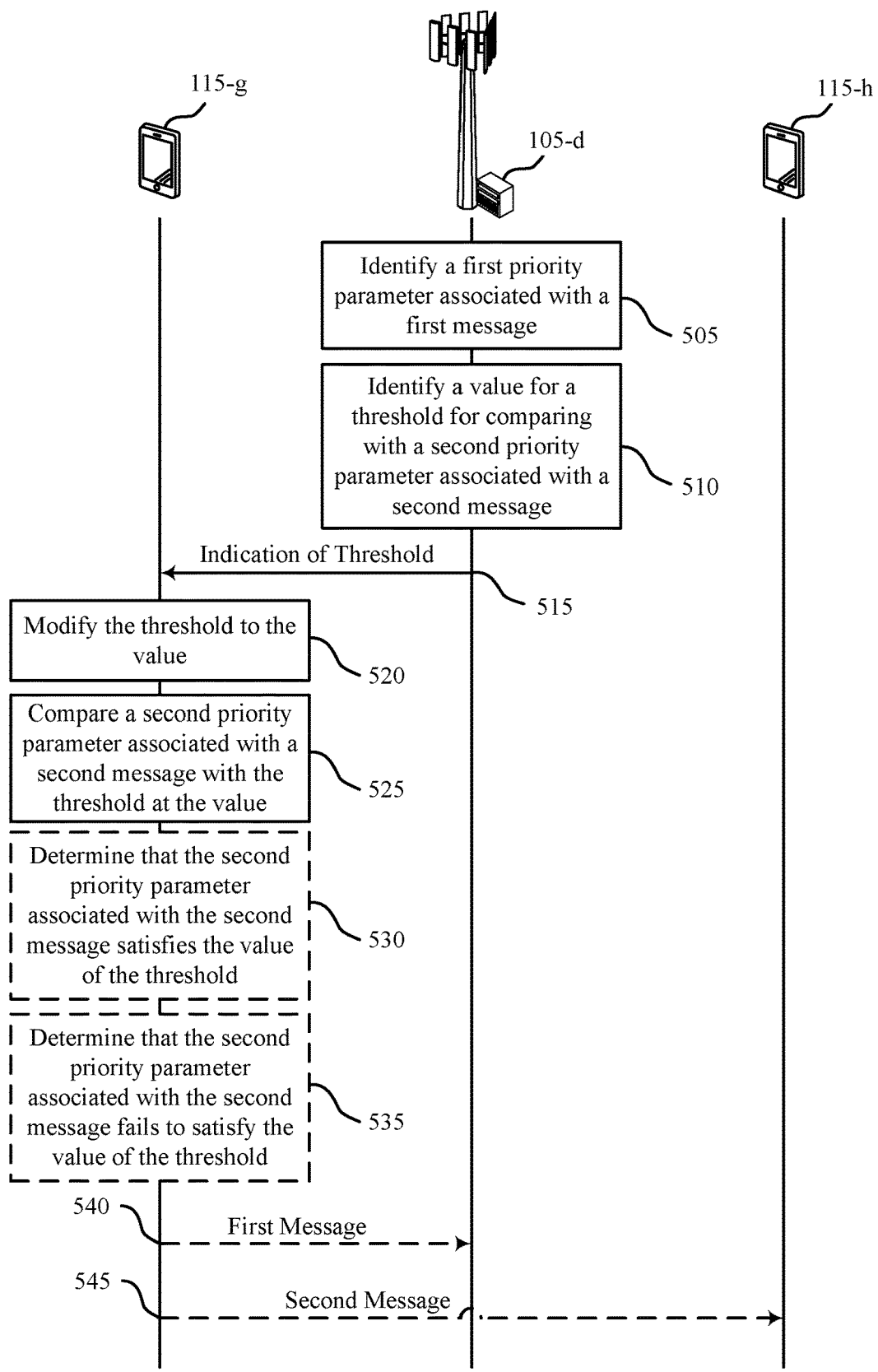
FIG. 5 illustrates an example of a process flow that supports prioritization techniques between communication links in accordance with aspects of the present disclosure.

FIG. 5 illustrates an example of a process flow 500 that supports prioritization techniques between communication links in accordance with aspects of the present disclosure. In some examples, the process flow 500 may implement aspects of the wireless communications system 100 or the wireless communications system 200. The process flow 400 may include a UE 115-*g*, a UE 115-*h*, and a base station 105-*d*, which may be examples of corresponding devices as described herein. In some examples, the operations illustrated in the process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

In some examples, the base station 105-*d* and the UE 115-*g* may support dynamic transmissions of an indication of a threshold value that the UE 115-*g* may use to determine whether to communicate a first message or a second message when the first message and the second message are scheduled for the same transmission resources or for at least partially overlapping transmission resources (e.g., fully or partially overlapping time resources). For example, the base station 105-*d* may update the configured threshold (e.g., the RRC configured threshold) dynamically (e.g., more often or more frequently based on changing priorities of the first message or the second message). As such, the base station 105-*d* may more frequently adapt the threshold to a priority of the first message carried by a first communication link (e.g., a priority of the Uu link) between the UE 115-*g* and the base station 105-*d*, which may result in smaller discrepancies between the configured threshold and the priority of the first message and may enable the base station 105-*d* to have more flexibility and control over how the UE 115-*g* may prioritize communication links.

At 505, the base station 105-*d* may identify a first priority parameter associated with a first message to be conveyed over a first communication link between the UE 115-*g* and the base station 105-*d*. For example, the base station 105-*d* may schedule the transmission of the first message between the UE 115-*g* and the base station 105-*d* and may identify a priority associated with the first message.

At 510, the base station 105-*d* may identify a value for a threshold for comparing with a second priority parameter associated with a second message to be conveyed over a second communication link between the UE 115-*g* and the UE 115-*h*. In some examples, the base station 105-*d* may identify or determine the value for the threshold based on identifying the first priority associated with the first message. For example, the base station 105-*d* may configure the value of the threshold to be equal or approximately equal to a value associated with the first priority parameter.

At 515, the base station 105-*d* may transmit an indication of the threshold or the value of the threshold to the UE 115-*g*. The base station 105-*d* may explicitly or implicitly transmit the value of the threshold. For instance, in some examples, the base station 105-*d* may transmit a control message to the UE 115-*g* that includes the value of the threshold. In some other examples, the base station 105-*d* may transmit a control message to the UE 115-*g* that includes an indicator (e.g., one or more bits or a field) that the UE 115-*g* may use to modify a current (e.g., an original or an RRC configured) value of the threshold to the value identified by the base station 105-*d*. In some other examples, the base station 105-*d* may transmit a control message to the UE 115-*d* that includes an indicator of the value of the threshold that the UE 115-*g* may use to modify a current value of the threshold to the value identified by the base station 105-d. In some aspects, the base station 105-d may transmit a MAC-CE to the UE 115-g including an indicator associated with the value of the threshold. In some other aspects, the base station 105-d may transmit DCI to the UE 115-g including an indicator associated with the value of the threshold. In some implementations, the indicator in the control message, the MAC-CE, or the DCI may indicate, to the UE 115-g, to use one of a set of threshold values stored at the UE 115-g (e.g., one of a set of RRC configured threshold values).

In some implementations, the base station 105-d may dynamically indicate a value of the threshold to the UE 115-g independent of the first priority associated with the first message. For example, the base station 105-d may dynamically transmit an indication of the value of the threshold to more flexibly control the traffic on one or more communication links associated with the UE 115-g. Additionally or alternatively, the base station 105-d may dynamically indicate a value of the threshold to the UE 115-g to update the threshold based on upcoming messages or channels (e.g., upcoming Uu link channels).

At 520, the UE 115-g may modify the value of the threshold to the value identified by the base station 105-d based on receiving the indication of the threshold or the value of the threshold. In some examples, the UE 115-g may overwrite or adjust a current value of the threshold such that the UE 115-g uses the value of the threshold identified by the base station 105-d at 510. The modified value of the threshold value may be valid for one or more collision occasions. For instance, in some examples, the modified value of the threshold value may be valid until the UE 115-g receives another indication of a threshold from the base station 105-d.

At 525, the UE 115-g may compare the second priority parameter associated with the second message to be conveyed over the second communication link between the UE 115-g and the UE 115-h with the value of the threshold (e.g., the modified value of the threshold), where the second message may be scheduled to use the same transmission resource as the first message or at least a portion of the transmission resource that the first message is scheduled to use. In some examples, the UE 115-g may compare the second priority parameter to the value of the threshold to determine whether to transmit the first message or the second message using the transmission resource.

At 530, the UE 115-g may, in some examples, determine that the second priority parameter associated with the second message satisfies (e.g., is greater than) the value of the threshold based on comparing the second priority parameter with the value of the threshold. Accordingly, the UE 115-g may determine that the second message is associated with a higher priority than the first message. As such, the UE 115-g may determine to prioritize the second communication link and may select the second message for transmission using the transmission resource.

Alternatively, at 535, the UE 115-g may determine that the second priority parameter associated with the second message fails to satisfy (e.g., is less than) the value of the threshold based on comparing the second priority parameter with the value of the threshold. Accordingly, the UE 115-g may determine that the first message is associated with a higher priority than the second message. As such, the UE 115-g may determine to prioritize the first communication link and may select the first message for transmission using the transmission resource.

At 540, the UE 115-g may optionally transmit the first message to the base station 105-d using the transmission resource via the first communication link. The UE 115-g may transmit the first message to the base station 105-d in examples in which the UE 115-g determines that the second priority parameter fails to satisfy the threshold at 535.

At 540, the UE 115-g may optionally transmit the second message to the base station 105-d using the transmission resource and the first communication link. The UE 115-g may transmit the second message to the base station 105-d in examples in which the UE 115-g determines that the second priority parameter satisfies the threshold at 530.

Figure 6:
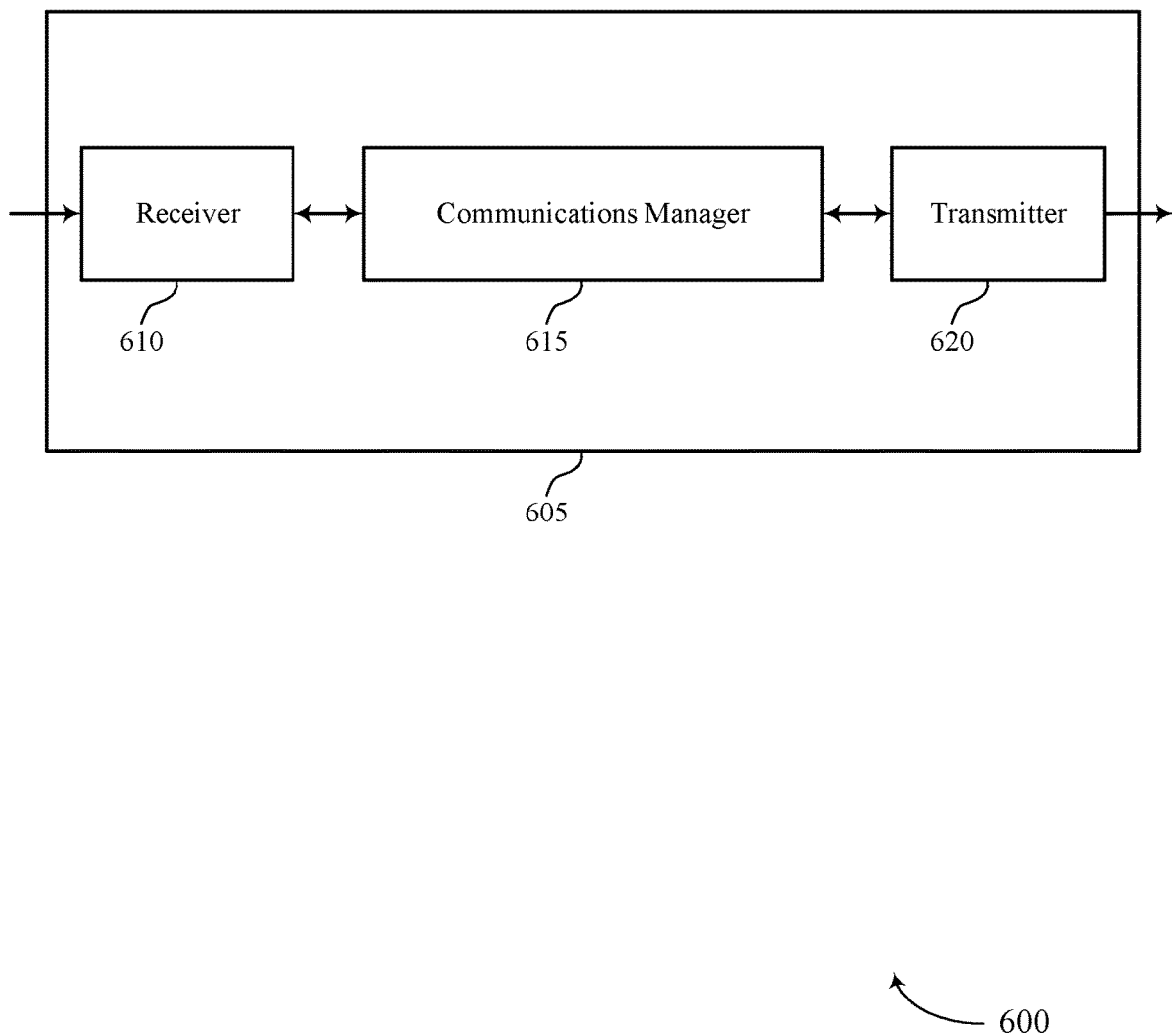
FIGS. 6 and 7 show block diagrams of devices that support prioritization techniques between communication links in accordance with aspects of the present disclosure.

FIG. 6 shows a block diagram 600 of a device 605 that supports prioritization techniques between communication links in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to prioritization techniques between communication links, etc.). Information may be passed on to other components of the device 605. The receiver 610 may be an example of aspects of the transceiver 920 described with reference to FIG. 9. The receiver 610 may utilize a single antenna or a set of antennas.

In some implementations, the communications manager 615 may identify a first message for a base station to be conveyed over a first communication link between the first UE and the base station using a transmission resource of the first UE, identify a second message for a second UE to be conveyed over a second communication link between the first UE and the second UE using the transmission resource of the first UE, transmit the selected one of the first message or the second message using the transmission resource of the first UE, identify a priority parameter associated with the first message, and select one of the first message or the second message to transmit using the transmission resource based on identifying the priority parameter associated with the first message for the base station.

Additionally or alternatively, the communications manager 615 may receive, from a base station, a value of a threshold for determining whether to send a first message or a second message using a transmission resource of the first UE, the first message to be conveyed over a first communication link between the first UE and the base station, the second message to be conveyed over a second communication link between the first UE and a second UE, where the value is based on a first priority parameter associated with the first message, modify the threshold to the value based on receiving the value from the base station, compare a second priority parameter associated with the second message with the threshold at the value based on modifying the threshold, select one of the first message or the second message to transmit using the transmission resource based on comparing the second priority parameter with the threshold, and transmit the selected one of the first message or the second message using the transmission resource of the first UE. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its subcomponents may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure. In some examples, the communications manager 615, or its sub-components, may include the receiver 610 and the transmitter 620.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may allow the device 605 to account for both of the priorities of a first message and a second message when the device is scheduled for simultaneous communications associated with the first message and the second message over two different communication links. In some examples, accounting for the priorities of both of the first message and the second message may result in more accurate prioritization decisions between communication links. As such, the device 605 may maintain a sufficient throughput of high priority communications during transmission intervals when the device is scheduled for communications over multiple communication links, which may reduce latency of high priority or mission critical communications.

Figure 7:
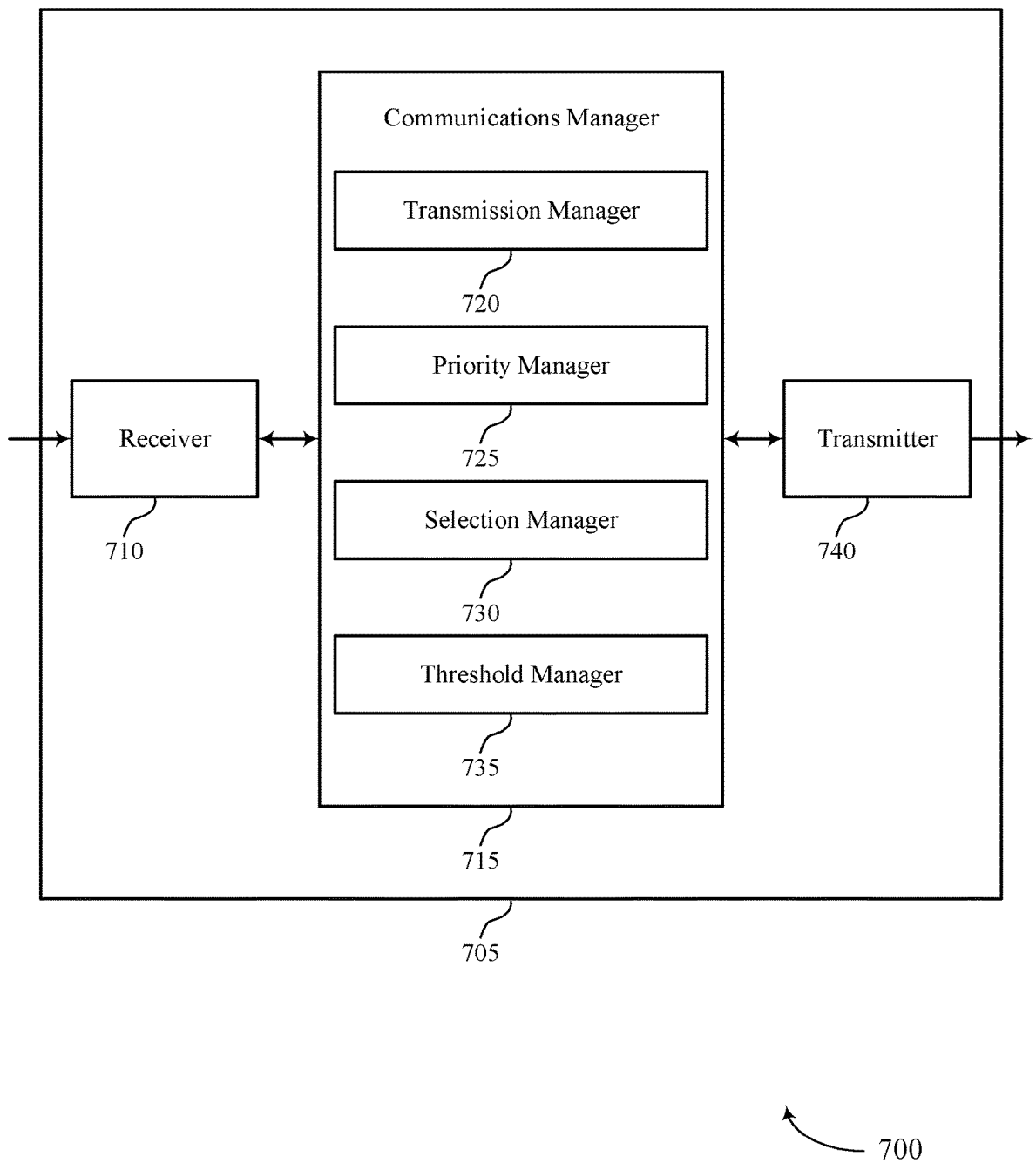

FIG. 7 shows a block diagram 700 of a device 705 that supports prioritization techniques between communication links in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to prioritization techniques between communication links, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a transmission manager 720, a priority manager 725, a selection manager 730, and a threshold manager 735. The communications manager 715 may be an example of aspects of the communications manager 910 described herein.

In some implementations, the transmission manager 720 may identify a first message for a base station to be conveyed over a first communication link between the first UE and the base station using a transmission resource of the first UE. The transmission manager 720 may also identify a second message for a second UE to be conveyed over a second communication link between the first UE and the second UE using the transmission resource of the first UE. The priority manager 725 may identify a priority parameter associated with the first message. The selection manager 730 may select one of the first message or the second message to transmit using the transmission resource based on identifying the priority parameter associated with the first message for the base station. The transmission manager 720 (using the transmitter 740) may transmit the selected one of the first message or the second message using the transmission resource of the first UE.

Additionally or alternatively, the threshold manager 735 may receive, from a base station, a value of a threshold for determining whether to send a first message or a second message using a transmission resource of the first UE, the first message to be conveyed over a first communication link between the first UE and the base station, the second message to be conveyed over a second communication link between the first UE and a second UE, where the value is based on a first priority parameter associated with the first message. The threshold manager 735 may also modify the threshold to the value based on receiving the value from the base station. The threshold manager 735 may also compare a second priority parameter associated with the second message with the threshold at the value based on modifying the threshold. The selection manager 730 may select one of the first message or the second message to transmit using the transmission resource based on comparing the second priority parameter with the threshold. The transmission manager 720 (using the transmitter 740) may transmit the selected one of the first message or the second message using the transmission resource of the first UE.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
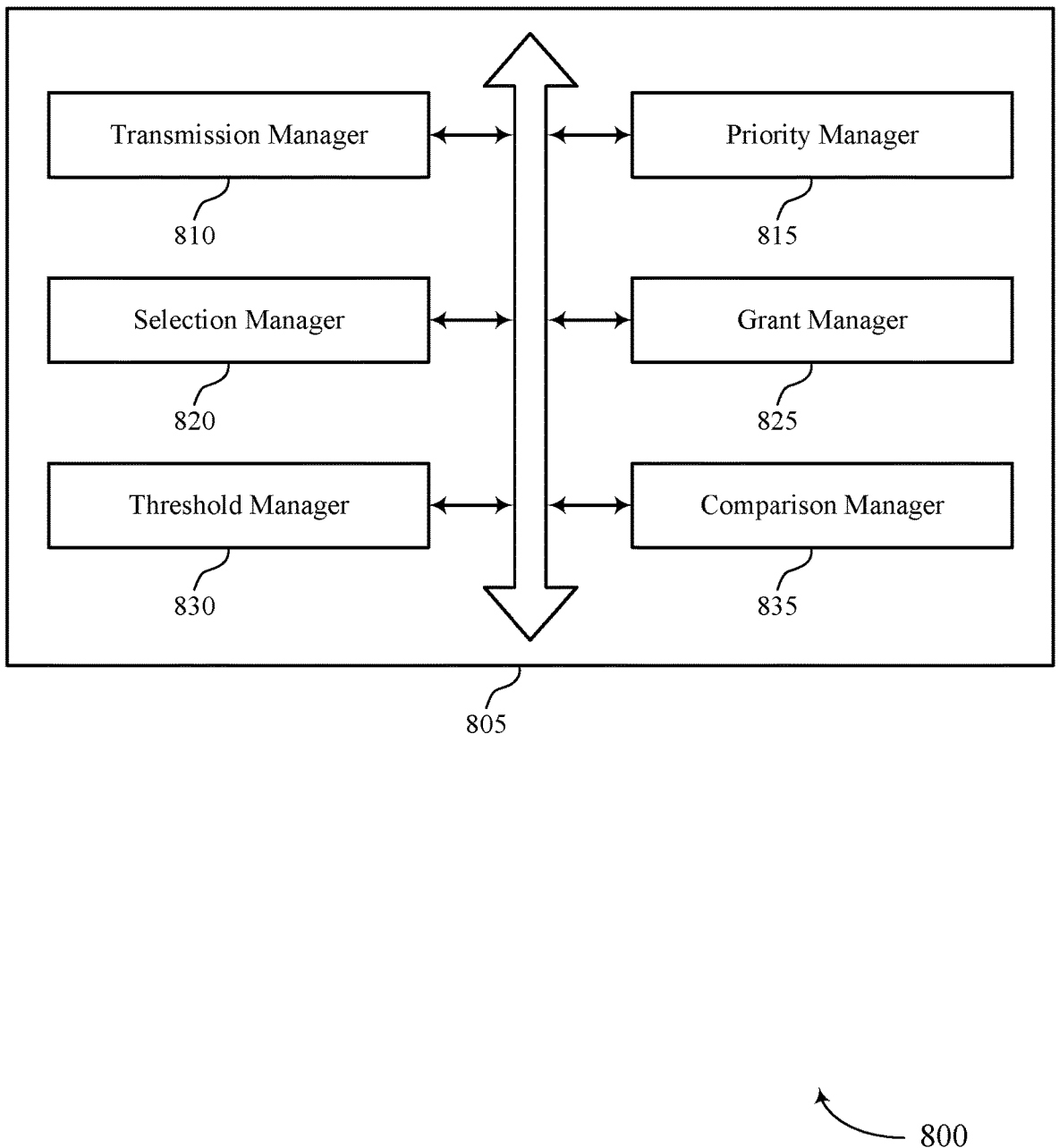
FIG. 8 shows a block diagram of a communications manager that supports prioritization techniques between communication links in accordance with aspects of the present disclosure.

FIG. 8 shows a block diagram 800 of a communications manager 805 that supports prioritization techniques between communication links in accordance with aspects of the present disclosure. The communications manager 805 may be an example of aspects of a communications manager 615, a communications manager 715, or a communications manager 910 described herein. The communications manager 805 may include a transmission manager 810, a priority manager 815, a selection manager 820, a grant manager 825, a threshold manager 830, and a comparison manager 835. Each of these modules may communicate, directly or indirectly, with one another (e.g., via one or more buses).

The transmission manager 810 may identify a first message for a base station to be conveyed over a first communication link between the first UE and the base station using a transmission resource of the first UE. In some examples, the transmission manager 810 may identify a second message for a second UE to be conveyed over a second communication link between the first UE and the second UE using the transmission resource of the first UE.

In some examples, the transmission manager 810 may transmit the selected one of the first message or the second message using the transmission resource of the first UE. In some examples, the transmission manager 810 may transmit the selected one of the first message or the second message using the transmission resource of the first UE.

The priority manager 815 may identify a priority parameter associated with the first message. In some examples, the priority manager 815 may identify a second priority parameter associated with the second message, where selecting the one of the first message or the second message is based on the second priority parameter. In some examples, the priority manager 815 may identify the priority parameter associated with the first message.

In some examples, the priority manager 815 may identify the second priority parameter associated with the second message, where comparing the priority parameter with the second priority parameter is based on identifying the priority parameter and the second priority parameter. In some examples, the priority manager 815 may identify the second priority parameter associated with the second message, where selecting the one of the first message or the second message is based on identifying the second priority parameter.

The selection manager 820 may select one of the first message or the second message to transmit using the transmission resource based on identifying the priority parameter associated with the first message for the base station. In some examples, the selection manager 820 may select one of the first message or the second message to transmit using the transmission resource based on comparing the second priority parameter with the threshold. In some examples, the selection manager 820 may identify that the first message and the second message cannot both be transmitted from the first UE using the transmission resource, where the selecting one of the first message or the second message is based on identifying that the first message and the second message cannot both be transmitted from the first UE using the transmission resource.

The grant manager 825 may receive a grant message for the first message from the base station, where identifying the priority parameter is based on receiving the grant message.

The threshold manager 830 may receive, from a base station, a value of a threshold for determining whether to send a first message or a second message using a transmission resource of the first UE, the first message to be conveyed over a first communication link between the first UE and the base station, the second message to be conveyed over a second communication link between the first UE and a second UE, where the value is based on a first priority parameter associated with the first message. In some examples, the threshold manager 830 may modify the threshold to the value based on receiving the value from the base station.

In some examples, the threshold manager 830 may compare a second priority parameter associated with the second message with the threshold at the value based on modifying the threshold. In some examples, the threshold manager 830 may modify a threshold for comparing with a second priority parameter associated with the second message from a first value to a second value based on the priority parameter associated with the first message. In some examples, the threshold manager 830 may compare the second priority parameter associated with the second message with the threshold having the second value based on modifying the threshold, where selecting the one of the first message or the second message is based on comparing the second priority parameter with the threshold having the second value.

In some examples, the threshold manager 830 may identify the second value of the threshold based on the priority parameter associated with the first message and the second priority parameter associated with the second message, where modifying the threshold to the second value is based on identifying the second value. In some examples, the threshold manager 830 may compare the priority parameter associated with the first message with the second value of the threshold based on identifying the second value, where modifying the threshold is based on comparing the priority parameter with the second value. In some examples, the threshold manager 830 may determine that the priority parameter associated with the first message satisfies the second value of the threshold based on identifying the second value, where modifying the threshold to the second value is based on determining that the priority parameter satisfies the second value of the threshold.

In some examples, determining that the second priority parameter associated with the second message satisfies the second value of the threshold based on comparing the second priority parameter with the threshold, where selecting the one of the first message or the second message includes selecting the second message to transmit using the transmission resource of the first UE based on determining that the second priority parameter satisfies the second value the threshold.

In some examples, determining that the second priority parameter associated with the second message fails to satisfy the second value of the threshold based on comparing the second priority parameter with the threshold, where selecting the one of the first message or the second message includes selecting the first message to transmit using the transmission resource of the first UE based on determining that the second priority parameter fails to satisfy the second value the threshold.

In some examples, the threshold manager 830 may identify a second value of a threshold for comparing with a second priority parameter associated with the second message different than a first value of the threshold currently used based on the priority parameter associated with the first message and the second priority parameter associated with the second message. In some examples, the threshold manager 830 may determine that the priority parameter associated with the first message fails to satisfy the second value of the threshold based on identifying the second value. In some examples, the threshold manager 830 may maintain the threshold at the first value based on determining that the priority parameter fails to satisfy the second value.

In some examples, determining that the second priority parameter associated with the second message satisfies the value of the threshold based on comparing the second priority parameter with the threshold, where selecting the one of the first message or the second message includes selecting the second message to transmit using the transmission resource of the first UE based on determining that the second priority parameter satisfies the value of the threshold.

In some examples, determining that the second priority parameter associated with the second message fails to satisfy the value of the threshold based on comparing the second priority parameter with the threshold, where selecting the one of the first message or the second message includes selecting the first message to transmit using the transmission resource of the first UE based on determining that the second priority parameter fails to satisfy the value the threshold.

In some examples, the threshold manager 830 may receive a control message that includes an indicator for the first UE to modify a current value of the threshold to the value. In some examples, the threshold manager 830 may receive a control message that includes the value of the threshold. In some examples, the threshold manager 830 may receive a control message that includes an indicator of the value of the threshold that the first UE uses to modify a current value of the threshold to the value.

In some examples, the threshold manager 830 may receive a MAC-CE including an indicator associated with the value of the threshold. In some examples, the threshold manager 830 may receive a DCI including an indicator associated with the value of the threshold.

The comparison manager 835 may compare the priority parameter associated with the first message with a second priority parameter associated with the second message, where selecting the one of the first message or the second message is based on comparing the priority parameter with the second priority parameter.

In some examples, determining that the priority parameter is greater than a second priority parameter associated with the second message, where selecting the one of the first message or the second message includes selecting the first message to transmit using the transmission resource of the first UE based on determining that the priority parameter is greater than the second priority parameter.

In some examples, determining that the priority parameter is less than a second priority parameter associated with the second message, where selecting the one of the first message or the second message includes selecting the second message to transmit using the transmission resource of the first UE based on determining that the priority parameter is less than the second priority parameter.

Figure 9:
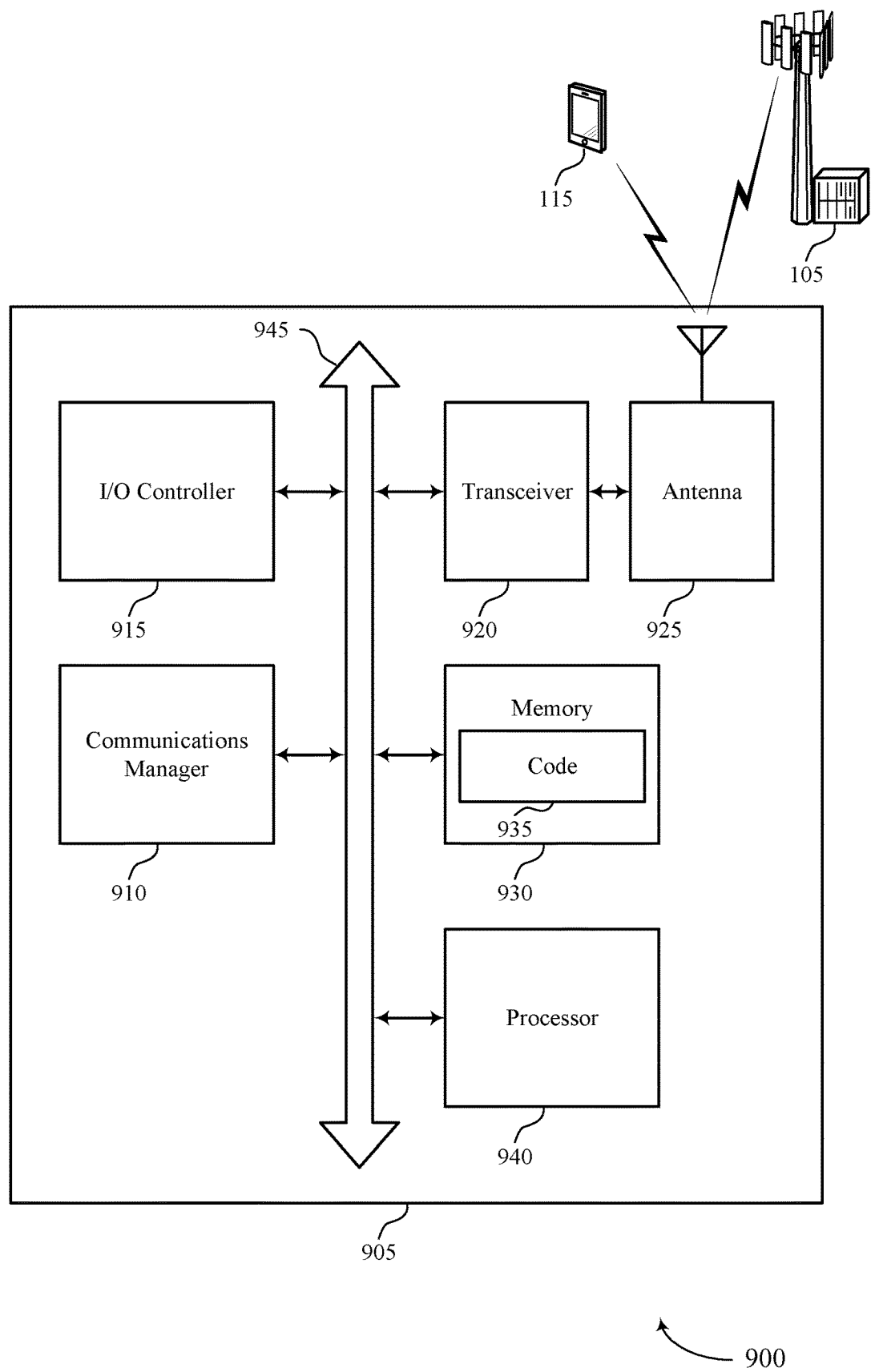
FIG. 9 shows a diagram of a system including a device that supports prioritization techniques between communication links in accordance with aspects of the present disclosure.

FIG. 9 shows a diagram of a system 900 including a device 905 that supports prioritization techniques between communication links in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via (or coupled with) one or more buses (e.g., bus 945).

In some implementations, the communications manager 910 may identify a first message for a base station to be conveyed over a first communication link between the first UE and the base station using a transmission resource of the first UE, identify a second message for a second UE to be conveyed over a second communication link between the first UE and the second UE using the transmission resource of the first UE, transmit the selected one of the first message or the second message using the transmission resource of the first UE, identify a priority parameter associated with the first message, and select one of the first message or the second message to transmit using the transmission resource based on identifying the priority parameter associated with the first message for the base station.

Additionally or alternatively, the communications manager 910 may receive, from a base station, a value of a threshold for determining whether to send a first message or a second message using a transmission resource of the first UE, the first message to be conveyed over a first communication link between the first UE and the base station, the second message to be conveyed over a second communication link between the first UE and a second UE, where the value is based on a first priority parameter associated with the first message, modify the threshold to the value based on receiving the value from the base station, compare a second priority parameter associated with the second message with the threshold at the value based on modifying the threshold, select one of the first message or the second message to transmit using the transmission resource based on comparing the second priority parameter with the threshold, and transmit the selected one of the first message or the second message using the transmission resource of the first UE.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting prioritization techniques between communication links).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
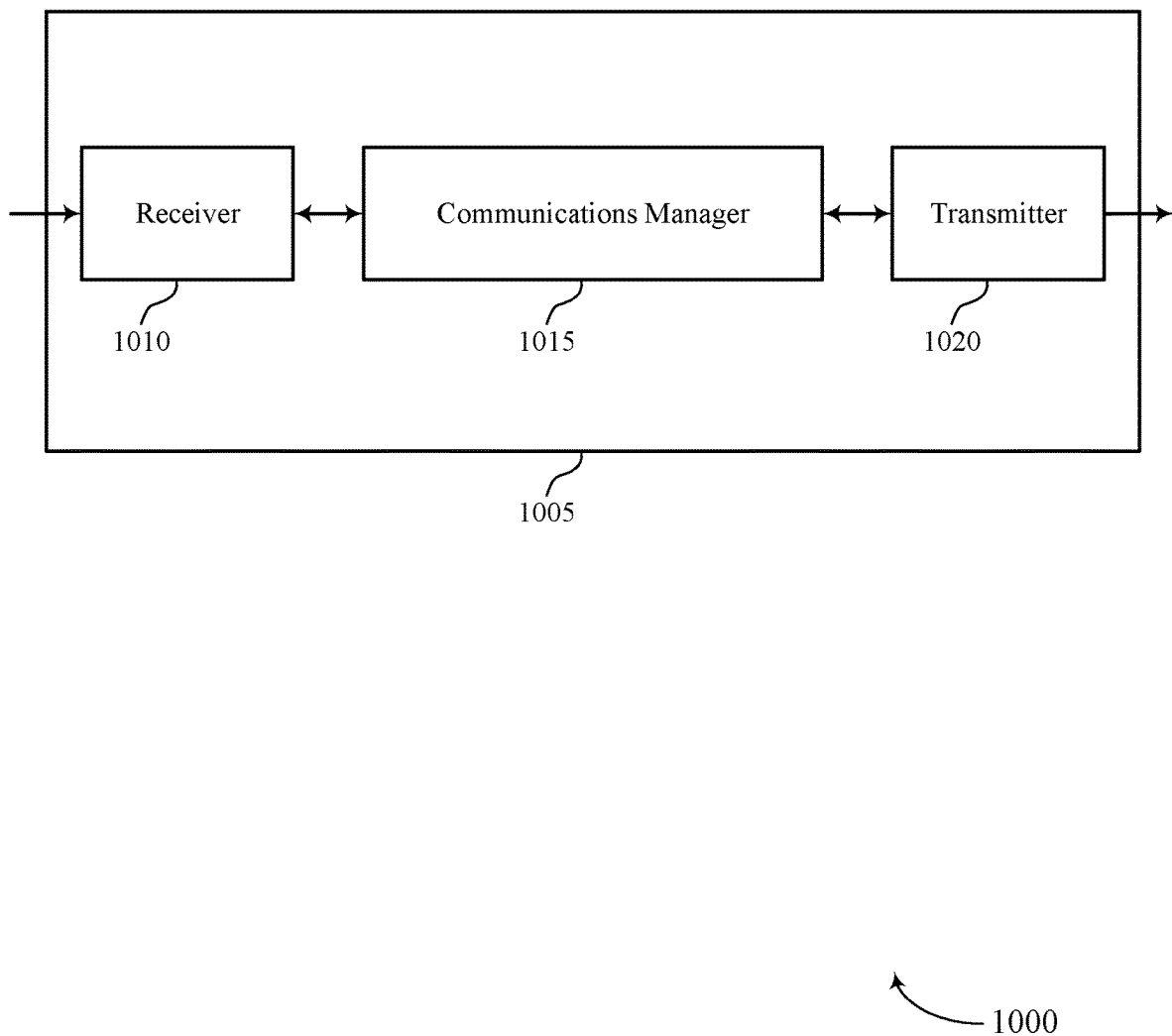
FIGS. 10 and 11 show block diagrams of devices that support prioritization techniques between communication links in accordance with aspects of the present disclosure.

FIG. 10 shows a block diagram 1000 of a device 1005 that supports prioritization techniques between communication links in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to prioritization techniques between communication links, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a first priority parameter associated with a first message to be conveyed over a first communication link between a first UE and the base station, identify a value for a threshold for comparing with a second priority parameter associated with a second message to be conveyed over a second communication link between the first UE and a second UE based on identifying the first priority parameter, and transmit the value of the threshold to the first UE based on identifying the value. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure. In some examples, the communications manager 1015, or its sub-components, may include the receiver 1010 and the transmitter 1020.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

The communications manager 1015 as described herein may be implemented to realize one or more potential advantages. One implementation may allow the device 1005 to more dynamically provide a threshold that a UE may use to determine which communication link to prioritize, which may enable greater flexibility and control over how the UE prioritizes traffic over one or more communication links.

Figure 11:
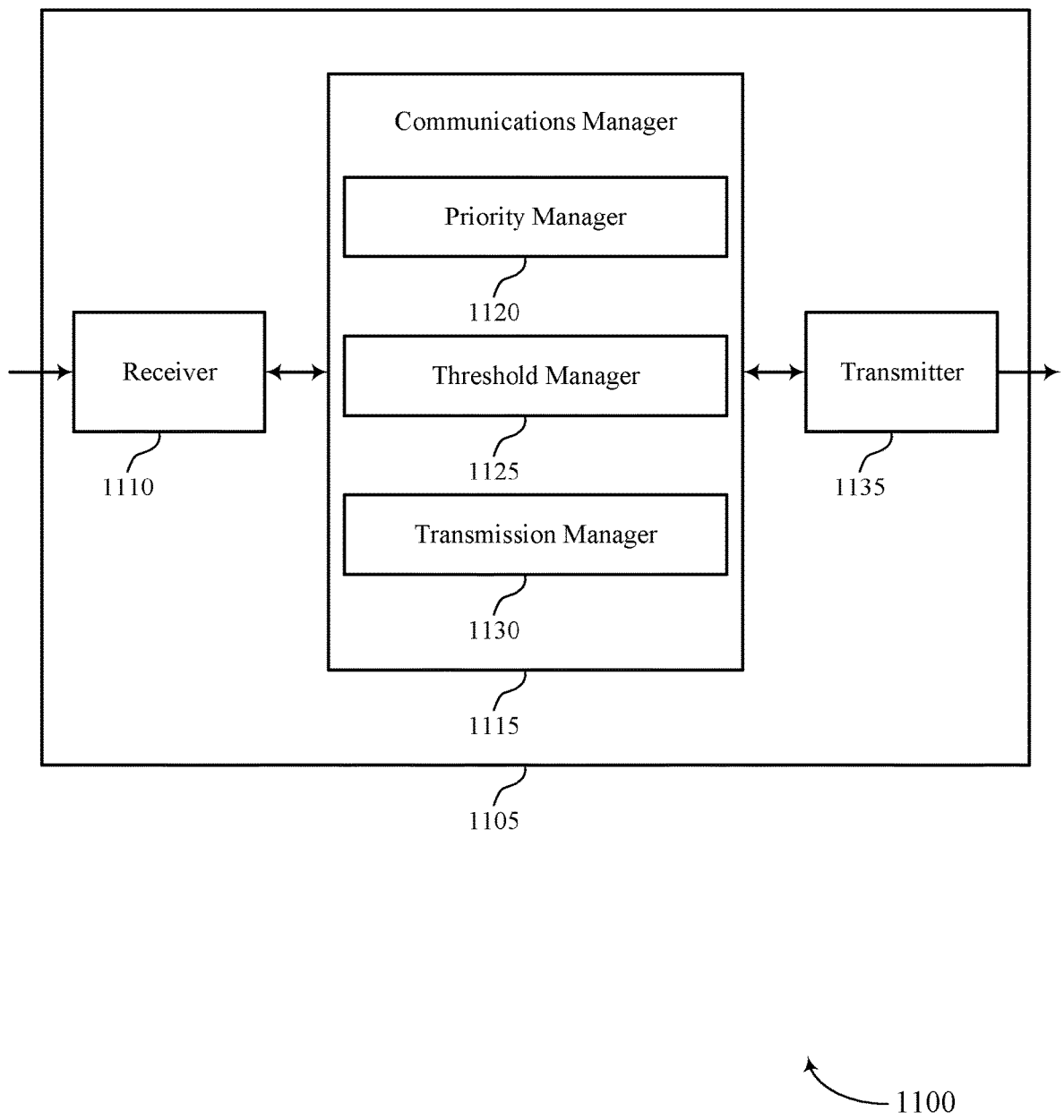

FIG. 11 shows a block diagram 1100 of a device 1105 that supports prioritization techniques between communication links in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to prioritization techniques between communication links, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a priority manager 1120, a threshold manager 1125, and a transmission manager 1130. The communications manager 1115 may be an example of aspects of the communications manager 1310 described herein.

The priority manager 1120 may identify a first priority parameter associated with a first message to be conveyed over a first communication link between a first UE and the base station. The threshold manager 1125 may identify a value for a threshold for comparing with a second priority parameter associated with a second message to be conveyed over a second communication link between the first UE and a second UE based on identifying the first priority parameter. The transmission manager 1130 (using the transmitter 1135) may transmit the value of the threshold to the first UE based on identifying the value.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
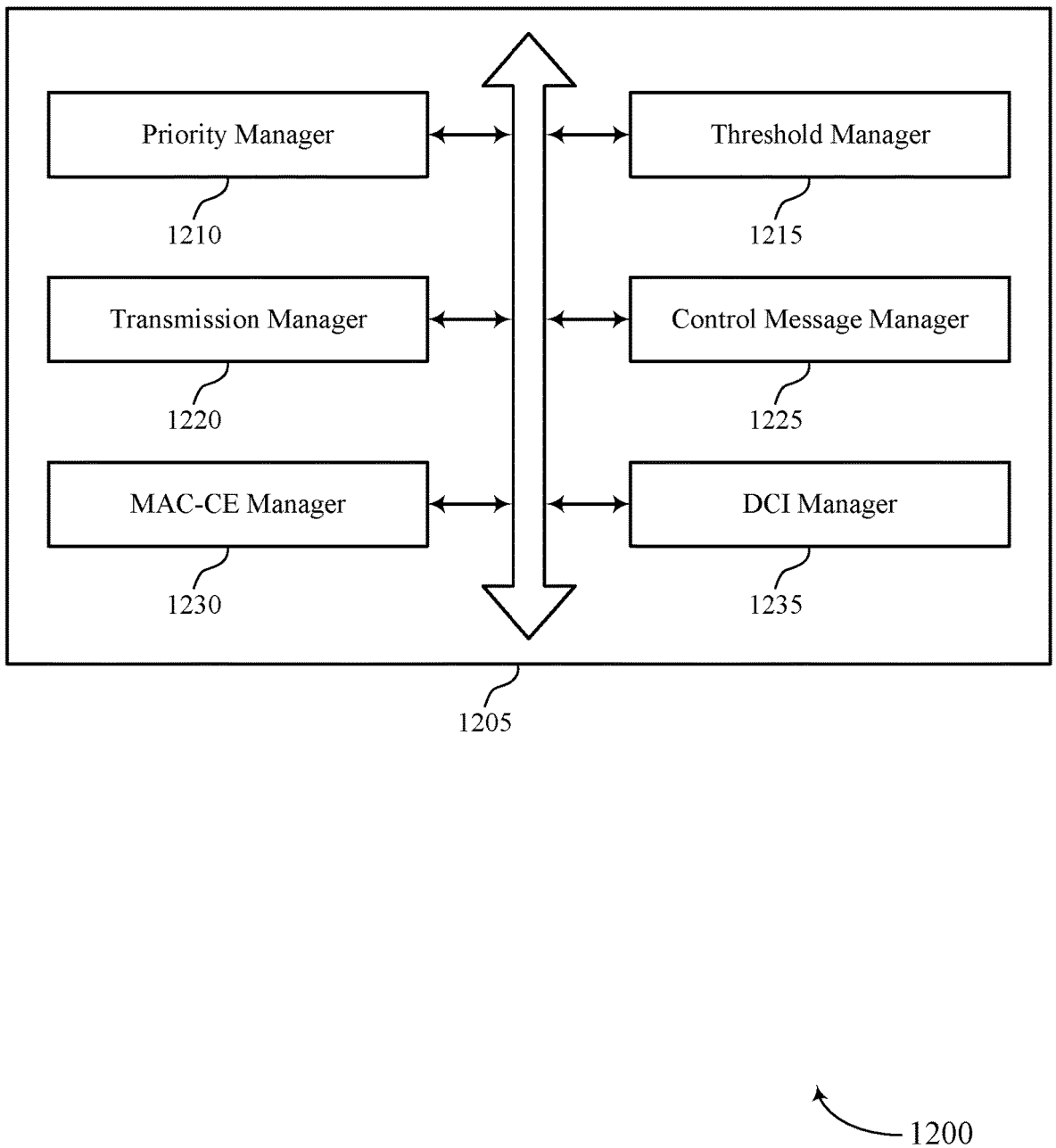
FIG. 12 shows a block diagram of a communications manager that supports prioritization techniques between communication links in accordance with aspects of the present disclosure.

FIG. 12 shows a block diagram 1200 of a communications manager 1205 that supports prioritization techniques between communication links in accordance with aspects of the present disclosure. The communications manager 1205 may be an example of aspects of a communications manager 1015, a communications manager 1115, or a communications manager 1310 described herein. The communications manager 1205 may include a priority manager 1210, a threshold manager 1215, a transmission manager 1220, a control message manager 1225, a MAC-CE manager 1230, and a DCI manager 1235. Each of these modules may communicate, directly or indirectly, with one another (e.g., via one or more buses).

The priority manager 1210 may identify a first priority parameter associated with a first message to be conveyed over a first communication link between a first UE and the base station. The threshold manager 1215 may identify a value for a threshold for comparing with a second priority parameter associated with a second message to be conveyed over a second communication link between the first UE and a second UE based on identifying the first priority parameter.

The transmission manager 1220 may transmit the value of the threshold to the first UE based on identifying the value. The control message manager 1225 may transmit a control message that includes an indicator for the first UE to modify a current value of the threshold to the value. In some examples, the control message manager 1225 may transmit a control message that includes the value of the threshold.

In some examples, the control message manager 1225 may transmit a control message that includes an indicator of the value of the threshold that the first UE uses to modify a current value of the threshold to the value.

The MAC-CE manager 1230 may transmit a MAC-CE including an indicator associated with the value of the threshold. The DCI manager 1235 may transmit a DCI including an indicator associated with the value of the threshold.

Figure 13:
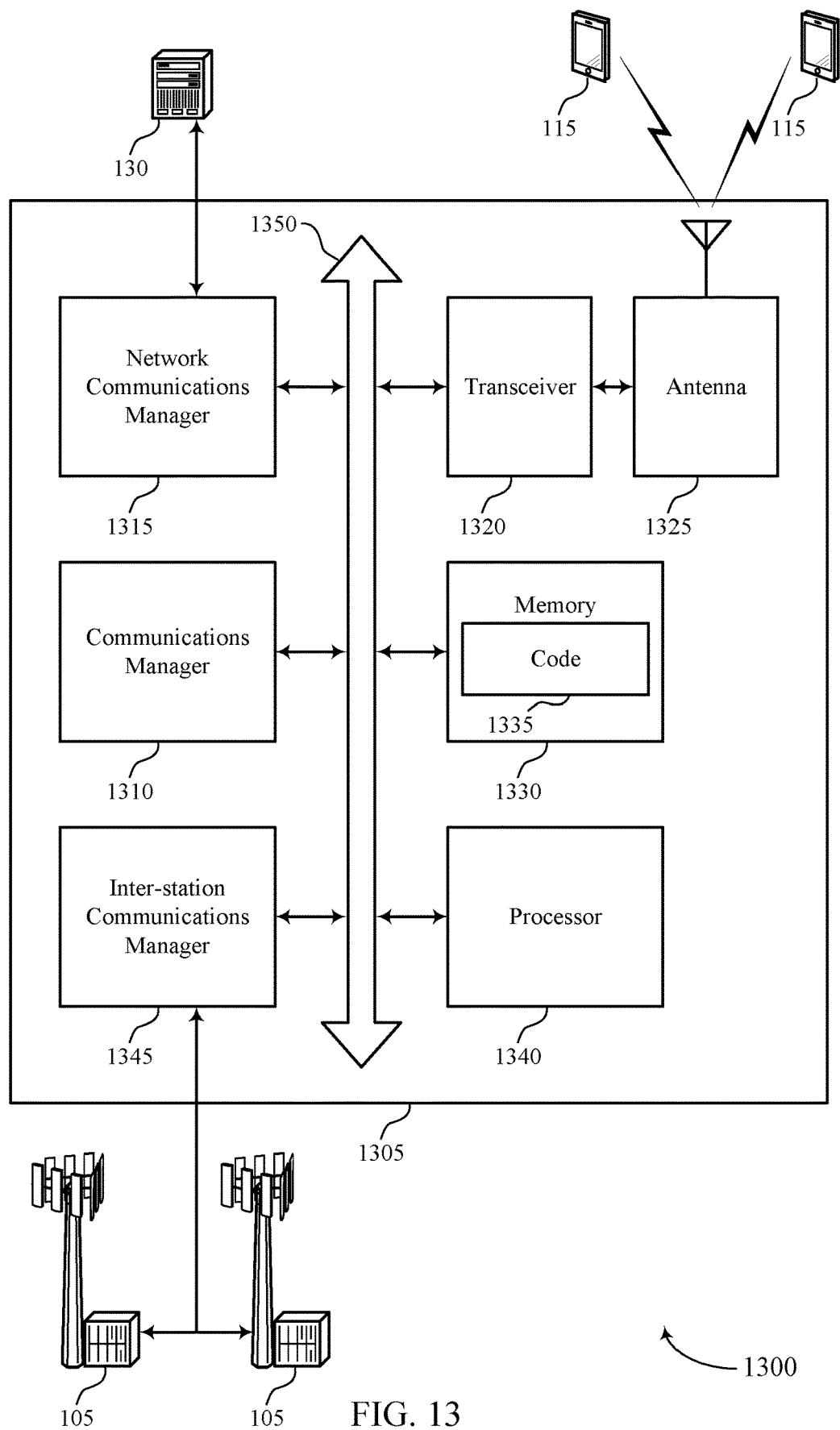
FIG. 13 shows a diagram of a system including a device that supports prioritization techniques between communication links in accordance with aspects of the present disclosure.

FIG. 13 shows a diagram of a system 1300 including a device 1305 that supports prioritization techniques between communication links in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via (or coupled with) one or more buses (e.g., bus 1350).

The communications manager 1310 may identify a first priority parameter associated with a first message to be conveyed over a first communication link between a first UE and the base station, identify a value for a threshold for comparing with a second priority parameter associated with a second message to be conveyed over a second communication link between the first UE and a second UE based on identifying the first priority parameter, and transmit the value of the threshold to the first UE based on identifying the value.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting prioritization techniques between communication links).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
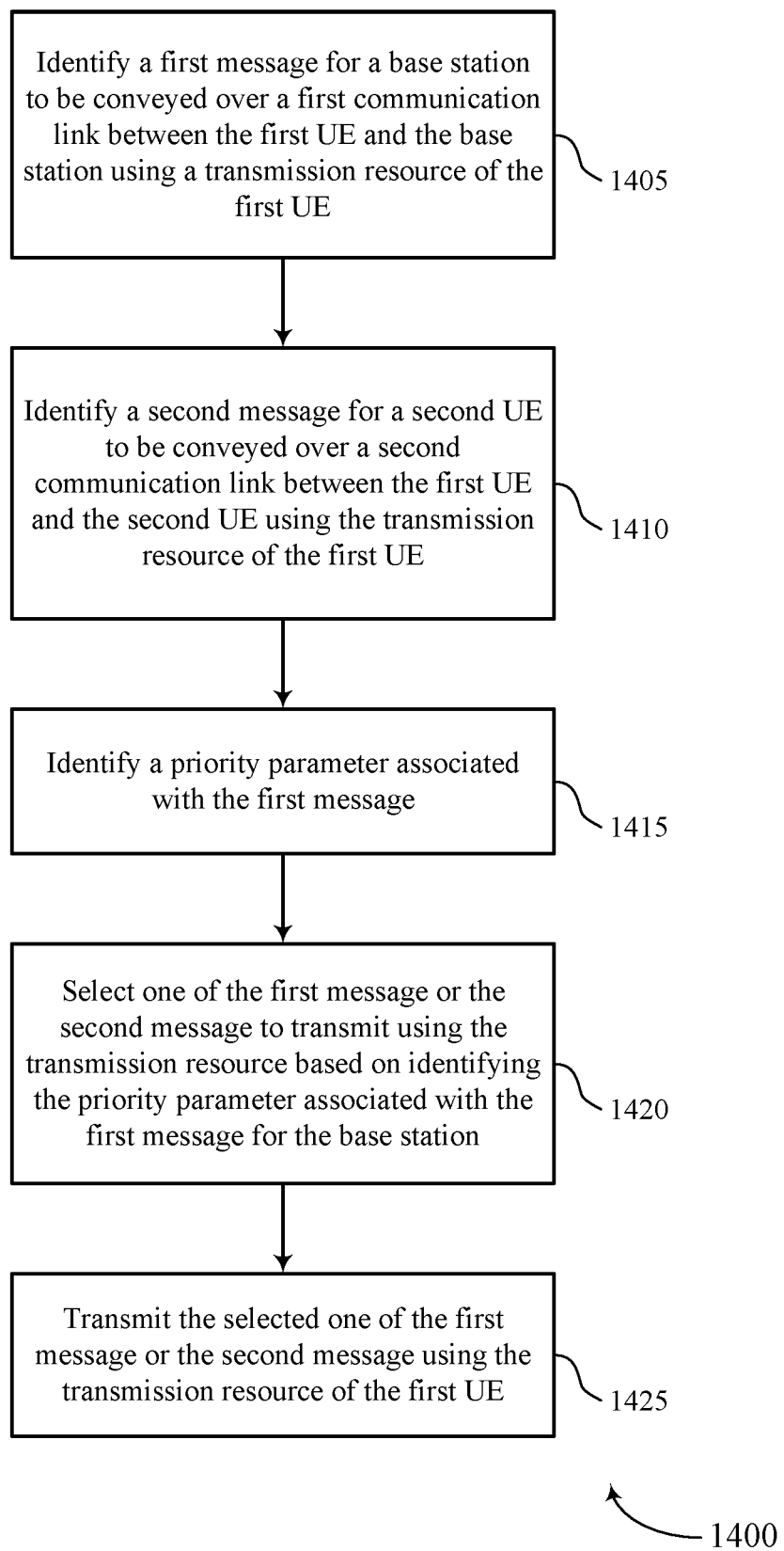
FIGS. 14 through 18 show flowcharts illustrating methods that support prioritization techniques between communication links in accordance with aspects of the present disclosure.

FIG. 14 shows a flowchart illustrating a method 1400 that supports prioritization techniques between communication links in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify a first message for a base station to be conveyed over a first communication link between the first UE and the base station using a transmission resource of the first UE. The operations of 1405 may be performed according to the methods described herein. In some examples, aspects of the operations of 1405 may be performed by a transmission manager as described with reference to FIGS. 6 through 9.

At 1410, the UE may identify a second message for a second UE to be conveyed over a second communication link between the first UE and the second UE using the transmission resource of the first UE. The operations of 1410 may be performed according to the methods described herein. In some examples, aspects of the operations of 1410 may be performed by a transmission manager as described with reference to FIGS. 6 through 9.

At 1415, the UE may identify a priority parameter associated with the first message. The operations of 1415 may be performed according to the methods described herein. In some examples, aspects of the operations of 1415 may be performed by a priority manager as described with reference to FIGS. 6 through 9.

At 1420, the UE may select one of the first message or the second message to transmit using the transmission resource based on identifying the priority parameter associated with the first message for the base station. The operations of 1420 may be performed according to the methods described herein. In some examples, aspects of the operations of 1420 may be performed by a selection manager as described with reference to FIGS. 6 through 9.

At 1425, the UE may transmit the selected one of the first message or the second message using the transmission resource of the first UE. The operations of 1425 may be performed according to the methods described herein. In some examples, aspects of the operations of 1425 may be performed by a transmission manager as described with reference to FIGS. 6 through 9.

Figure 15:
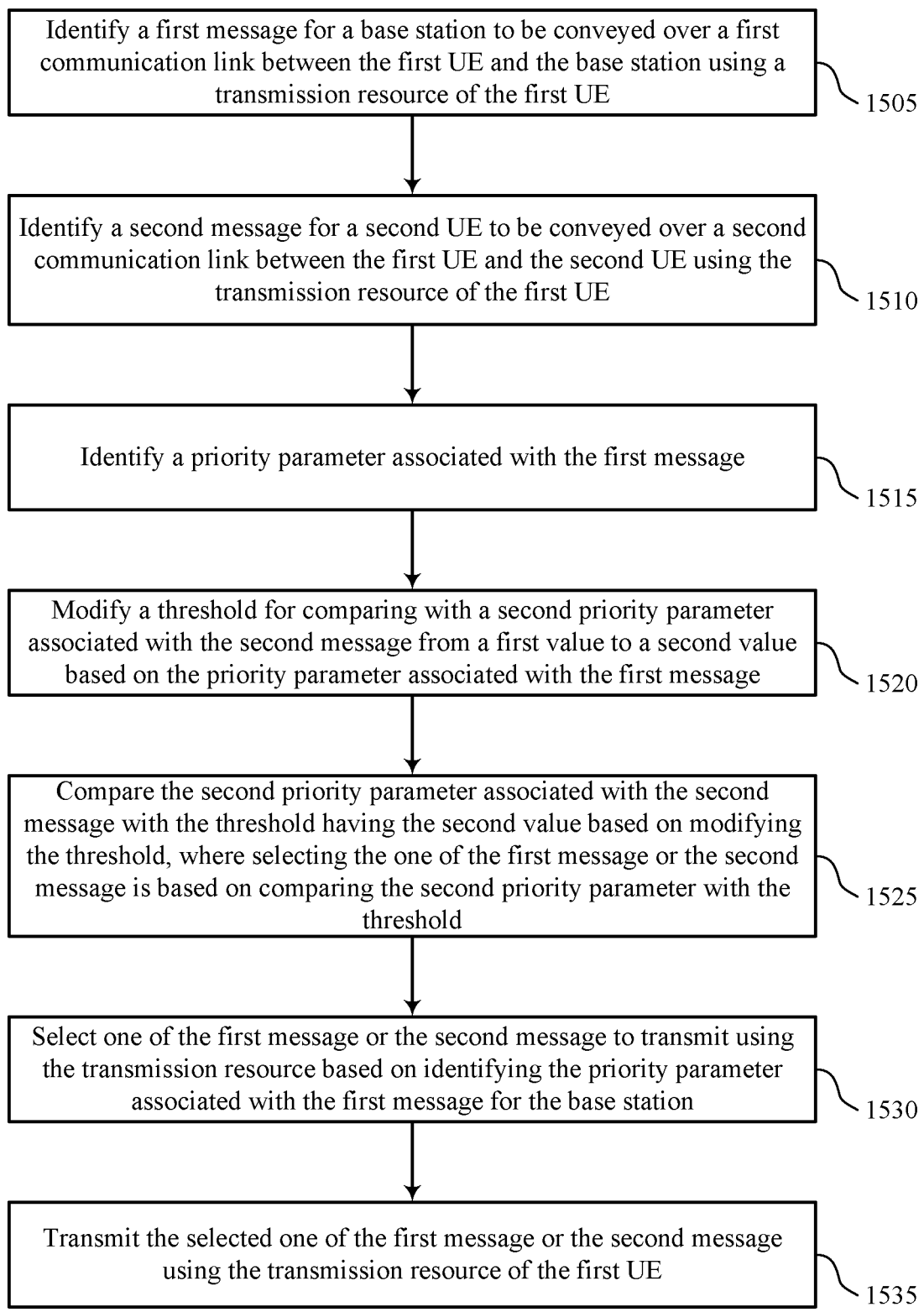

FIG. 15 shows a flowchart illustrating a method 1500 that supports prioritization techniques between communication links in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify a first message for a base station to be conveyed over a first communication link between the first UE and the base station using a transmission resource of the first UE. The operations of 1505 may be performed according to the methods described herein. In some examples, aspects of the operations of 1505 may be performed by a transmission manager as described with reference to FIGS. 6 through 9.

At 1510, the UE may identify a second message for a second UE to be conveyed over a second communication link between the first UE and the second UE using the transmission resource of the first UE. The operations of 1510 may be performed according to the methods described herein. In some examples, aspects of the operations of 1510 may be performed by a transmission manager as described with reference to FIGS. 6 through 9.

At 1515, the UE may identify a priority parameter associated with the first message. The operations of 1515 may be performed according to the methods described herein. In some examples, aspects of the operations of 1515 may be performed by a priority manager as described with reference to FIGS. 6 through 9.

At 1520, the UE may modify a threshold for comparing with a second priority parameter associated with the second message from a first value to a second value based on the priority parameter associated with the first message. The operations of 1520 may be performed according to the methods described herein. In some examples, aspects of the operations of 1520 may be performed by a threshold manager as described with reference to FIGS. 6 through 9.

At 1525, the UE may compare the second priority parameter associated with the second message with the threshold having the second value based on modifying the threshold, where selecting the one of the first message or the second message is based on comparing the second priority parameter with the threshold having the second value. The operations of 1525 may be performed according to the methods described herein. In some examples, aspects of the operations of 1525 may be performed by a threshold manager as described with reference to FIGS. 6 through 9.

At 1530, the UE may select one of the first message or the second message to transmit using the transmission resource based on identifying the priority parameter associated with the first message for the base station. The operations of 1530 may be performed according to the methods described herein. In some examples, aspects of the operations of 1530 may be performed by a selection manager as described with reference to FIGS. 6 through 9.

At 1535, the UE may transmit the selected one of the first message or the second message using the transmission resource of the first UE. The operations of 1535 may be performed according to the methods described herein. In some examples, aspects of the operations of 1535 may be performed by a transmission manager as described with reference to FIGS. 6 through 9.

Figure 16:
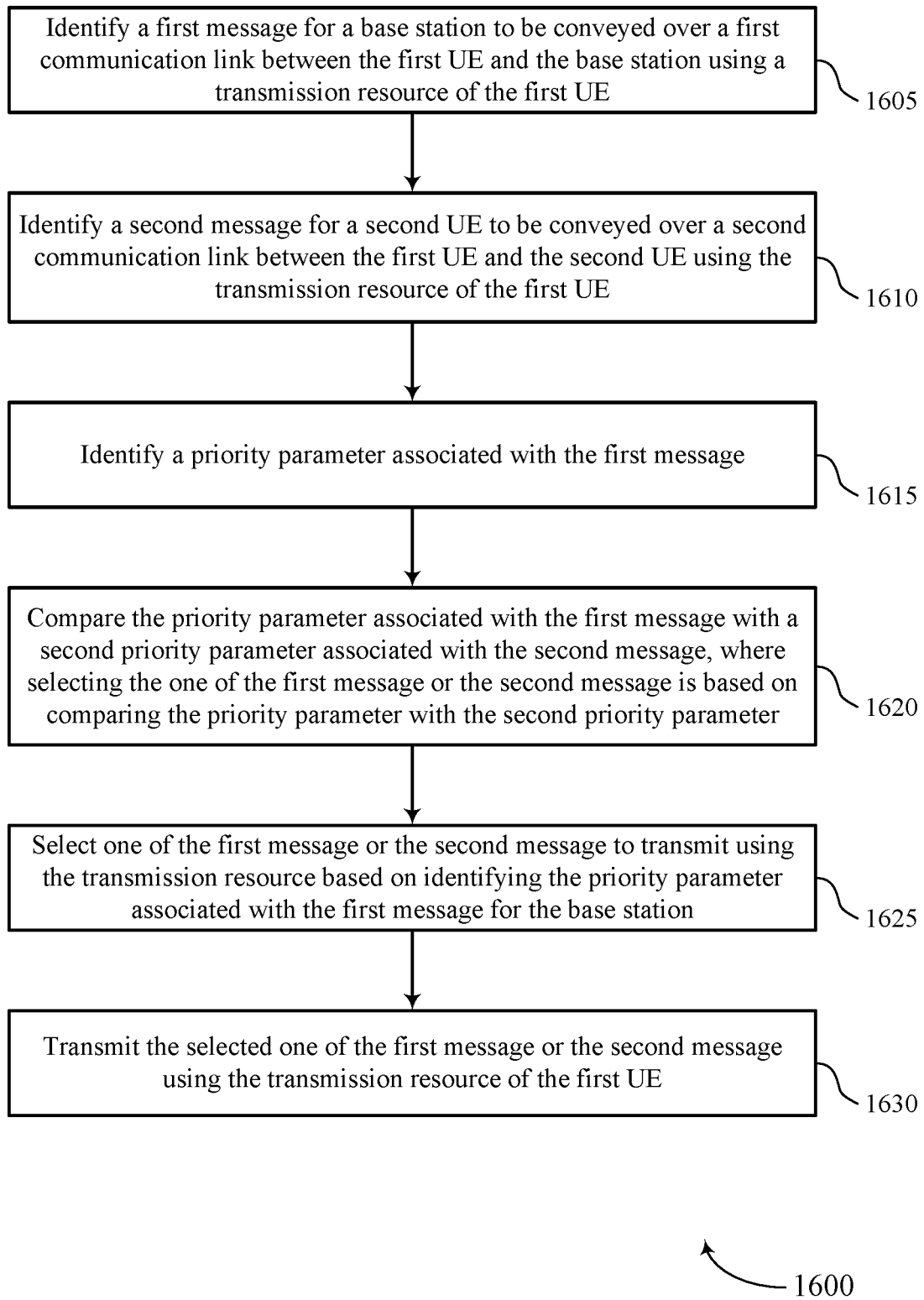

FIG. 16 shows a flowchart illustrating a method 1600 that supports prioritization techniques between communication links in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may identify a first message for a base station to be conveyed over a first communication link between the first UE and the base station using a transmission resource of the first UE. The operations of 1605 may be performed according to the methods described herein. In some examples, aspects of the operations of 1605 may be performed by a transmission manager as described with reference to FIGS. 6 through 9.

At 1610, the UE may identify a second message for a second UE to be conveyed over a second communication link between the first UE and the second UE using the transmission resource of the first UE. The operations of 1610 may be performed according to the methods described herein. In some examples, aspects of the operations of 1610 may be performed by a transmission manager as described with reference to FIGS. 6 through 9.

At 1615, the UE may identify a priority parameter associated with the first message. The operations of 1615 may be performed according to the methods described herein. In some examples, aspects of the operations of 1615 may be performed by a priority manager as described with reference to FIGS. 6 through 9.

At 1620, the UE may compare the priority parameter associated with the first message with a second priority parameter associated with the second message, where selecting the one of the first message or the second message is based on comparing the priority parameter with the second priority parameter. The operations of 1620 may be performed according to the methods described herein. In some examples, aspects of the operations of 1620 may be performed by a comparison manager as described with reference to FIGS. 6 through 9.

At 1625, the UE may select one of the first message or the second message to transmit using the transmission resource based on identifying the priority parameter associated with the first message for the base station. The operations of 1625 may be performed according to the methods described herein. In some examples, aspects of the operations of 1625 may be performed by a selection manager as described with reference to FIGS. 6 through 9.

At 1630, the UE may transmit the selected one of the first message or the second message using the transmission resource of the first UE. The operations of 1630 may be performed according to the methods described herein. In some examples, aspects of the operations of 1630 may be performed by a transmission manager as described with reference to FIGS. 6 through 9.

Figure 17:
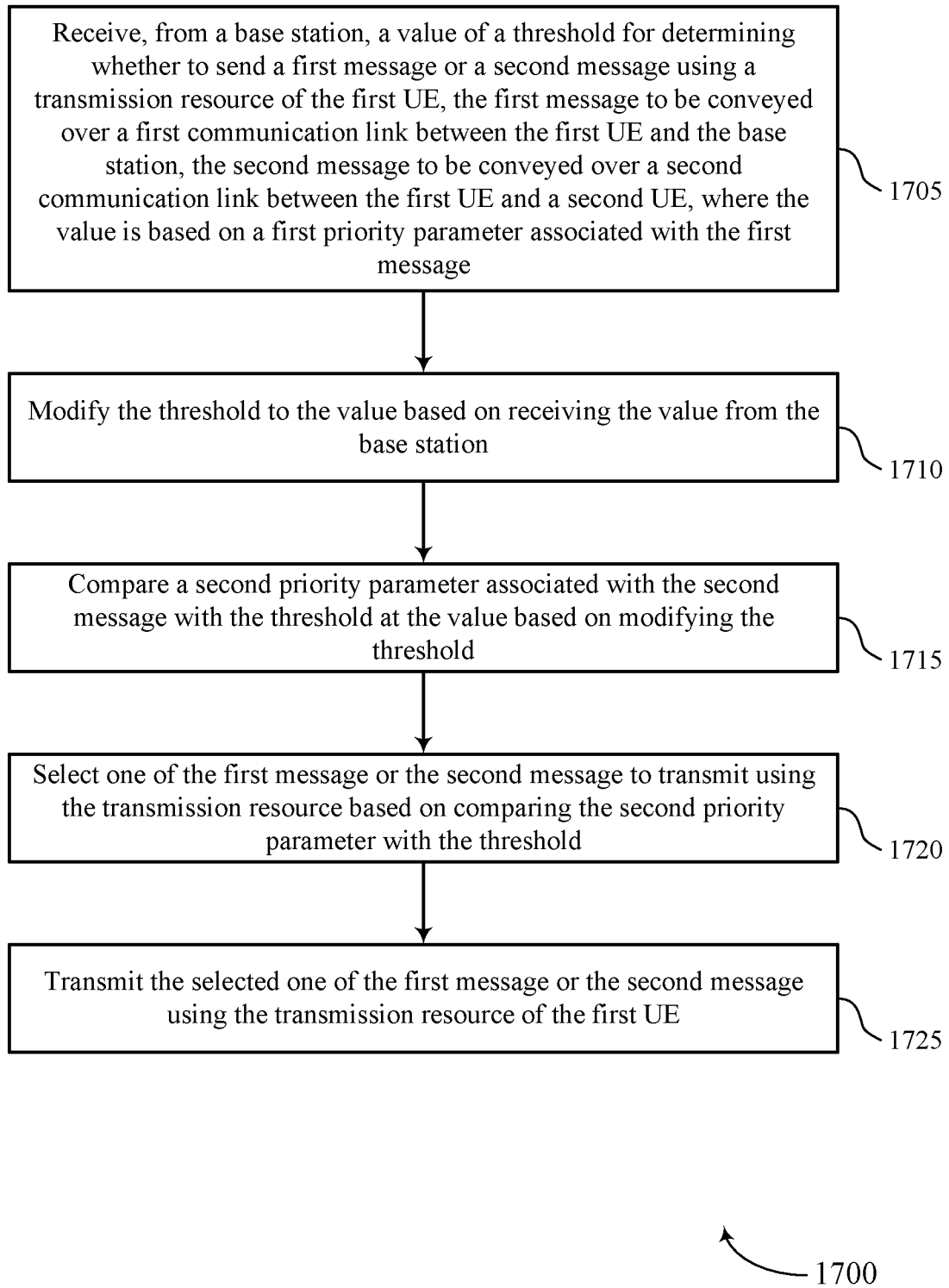

FIG. 17 shows a flowchart illustrating a method 1700 that supports prioritization techniques between communication links in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, a value of a threshold for determining whether to send a first message or a second message using a transmission resource of the first UE, the first message to be conveyed over a first communication link between the first UE and the base station, the second message to be conveyed over a second communication link between the first UE and a second UE, where the value is based on a first priority parameter associated with the first message. The operations of 1705 may be performed according to the methods described herein. In some examples, aspects of the operations of 1705 may be performed by a threshold manager as described with reference to FIGS. 6 through 9.

At 1710, the UE may modify the threshold to the value based on receiving the value from the base station. The operations of 1710 may be performed according to the methods described herein. In some examples, aspects of the operations of 1710 may be performed by a threshold manager as described with reference to FIGS. 6 through 9.

At 1715, the UE may compare a second priority parameter associated with the second message with the threshold at the value based on modifying the threshold. The operations of 1715 may be performed according to the methods described herein. In some examples, aspects of the operations of 1715 may be performed by a threshold manager as described with reference to FIGS. 6 through 9.

At 1720, the UE may select one of the first message or the second message to transmit using the transmission resource based on comparing the second priority parameter with the threshold. The operations of 1720 may be performed according to the methods described herein. In some examples, aspects of the operations of 1720 may be performed by a selection manager as described with reference to FIGS. 6 through 9.

At 1725, the UE may transmit the selected one of the first message or the second message using the transmission resource of the first UE. The operations of 1725 may be performed according to the methods described herein. In some examples, aspects of the operations of 1725 may be performed by a transmission manager as described with reference to FIGS. 6 through 9.

Figure 18:
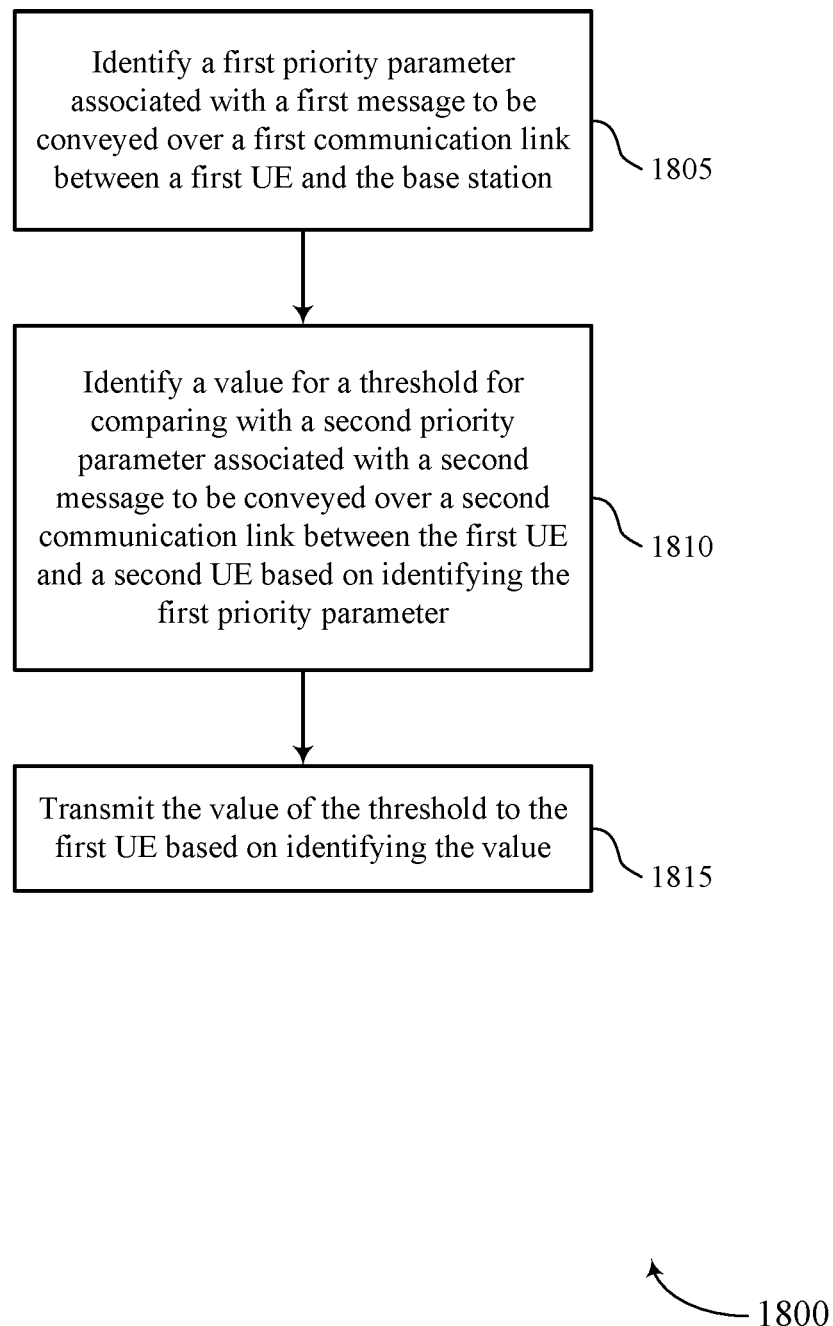

FIG. 18 shows a flowchart illustrating a method 1800 that supports prioritization techniques between communication links in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may identify a first priority parameter associated with a first message to be conveyed over a first communication link between a first UE and the base station. The operations of 1805 may be performed according to the methods described herein. In some examples, aspects of the operations of 1805 may be performed by a priority manager as described with reference to FIGS. 10 through 13.

At 1810, the base station may identify a value for a threshold for comparing with a second priority parameter associated with a second message to be conveyed over a second communication link between the first UE and a second UE based on identifying the first priority parameter. The operations of 1810 may be performed according to the methods described herein. In some examples, aspects of the operations of 1810 may be performed by a threshold manager as described with reference to FIGS. 10 through 13.

At 1815, the base station may transmit the value of the threshold to the first UE based on identifying the value. The operations of 1815 may be performed according to the methods described herein. In some examples, aspects of the operations of 1815 may be performed by a transmission manager as described with reference to FIGS. 10 through 13.

The following provides an overview of aspects of the present disclosure:

Aspect 1: A method for wireless communication at a first UE, comprising: identifying a first message for a base station to be conveyed over a first communication link between the first UE and the base station using a transmission resource of the first UE; identifying a second message for a second UE to be conveyed over a second communication link between the first UE and the second UE using the transmission resource of the first UE; identifying a priority parameter associated with the first message; selecting one of the first message or the second message to transmit using the transmission resource based at least in part on the identifying of the priority parameter associated with the first message for the base station; and transmitting the selected one of the first message or the second message using the transmission resource of the first UE.

Aspect 2: The method of aspect 1, further comprising: identifying a second priority parameter associated with the second message, wherein the selecting of the one of the first message or the second message is based at least in part on the second priority parameter.

Aspect 3: The method of any of aspects 1 through 2, further comprising: receiving a grant message for the first message from the base station, wherein the identifying of the priority parameter is based at least in part on receiving the grant message.

Aspect 4: The method of any of aspects 1 through 3, further comprising: identifying that the first message and the second message cannot both be transmitted from the first UE using the transmission resource, wherein the selecting of one of the first message or the second message is based at least in part on the identifying that the first message and the second message cannot both be transmitted from the first UE using the transmission resource.

Aspect 5: The method of any of aspects 1 through 4, further comprising: modifying a threshold for comparing with a second priority parameter associated with the second message from a first value to a second value based at least in part on the priority parameter associated with the first message; and comparing the second priority parameter associated with the second message with the threshold having the second value based at least in part on the modifying of the threshold, wherein the selecting of the one of the first message or the second message is based at least in part on comparing the second priority parameter with the threshold having the second value.

Aspect 6: The method of aspect 5, further comprising: identifying the second value of the threshold based at least in part on the priority parameter associated with the first message and the second priority parameter associated with the second message, wherein the modifying of the threshold to the second value is based at least in part on the identifying of the second value.

Aspect 7: The method of aspect 6, further comprising: comparing the priority parameter associated with the first message with the second value of the threshold based at least in part on the identifying of the second value, wherein the modifying of the threshold is based at least in part on the comparing of the priority parameter with the second value.

Aspect 8: The method of any of aspects 6 through 7, further comprising: determining that the priority parameter associated with the first message satisfies the second value of the threshold based at least in part on the identifying of the second value, wherein the modifying of the threshold to the second value is based at least in part on the determining that the priority parameter satisfies the second value of the threshold.

Aspect 9: The method of any of aspects 5 through 8, further comprising: determining that the second priority parameter associated with the second message satisfies the second value of the threshold based at least in part on the comparing of the second priority parameter with the threshold, wherein the selecting of the one of the first message or the second message comprises selecting the second message to transmit using the transmission resource of the first UE based at least in part on the determining that the second priority parameter satisfies the second value the threshold.

Aspect 10: The method of any of aspects 5 through 8, further comprising: determining that the second priority parameter associated with the second message fails to satisfy the second value of the threshold based at least in part on the comparing of the second priority parameter with the threshold, wherein the selecting of the one of the first message or the second message comprises selecting the first message to transmit using the transmission resource of the first UE based at least in part on the determining that the second priority parameter fails to satisfy the second value the threshold.

Aspect 11: The method of any of aspects 1 through 4, further comprising: identifying a second value of a threshold for comparing with a second priority parameter associated with the second message different than a first value of the threshold currently used based at least in part on the priority parameter associated with the first message and the second priority parameter associated with the second message; determining that the priority parameter associated with the first message fails to satisfy the second value of the threshold based at least in part on the identifying of the second value; and maintaining the threshold at the first value based at least in part on the determining that the priority parameter fails to satisfy the second value.

Aspect 12: The method of any of aspects 1 through 4, further comprising: comparing the priority parameter associated with the first message with a second priority parameter associated with the second message, wherein the selecting of the one of the first message or the second message is based at least in part on the comparing of the priority parameter with the second priority parameter.

Aspect 13: The method of aspect 12, further comprising: identifying the priority parameter associated with the first message; and identifying the second priority parameter associated with the second message, wherein the comparing of the priority parameter with the second priority parameter is based at least in part on the identifying of the priority parameter and the second priority parameter.

Aspect 14: The method of any of aspects 1 through 4, 12, or 13, further comprising: determining that the priority parameter is greater than a second priority parameter associated with the second message, wherein the selecting of the one of the first message or the second message comprises selecting the first message to transmit using the transmission resource of the first UE based at least in part on the determining that the priority parameter is greater than the second priority parameter.

Aspect 15: The method of any of aspects 1 through 4, 12, or 13, further comprising: determining that the priority parameter is less than a second priority parameter associated with the second message, wherein the selecting of the one of the first message or the second message comprises selecting the second message to transmit using the transmission resource of the first UE based at least in part on the determining that the priority parameter is less than the second priority parameter.

Aspect 16: A method for wireless communication at a first UE, comprising: receiving, from a base station, a value of a threshold for determining whether to send a first message or a second message using a transmission resource of the first UE, the first message to be conveyed over a first communication link between the first UE and the base station, the second message to be conveyed over a second communication link between the first UE and a second UE, wherein the value is based at least in part on a first priority parameter associated with the first message; modifying the threshold to the value based at least in part on the receiving of the value from the base station; comparing a second priority parameter associated with the second message with the threshold at the value based at least in part on the modifying of the threshold; selecting one of the first message or the second message to transmit using the transmission resource based at least in part on the comparing of the second priority parameter with the threshold; and transmitting the selected one of the first message or the second message using the transmission resource of the first UE.

Aspect 17: The method of aspect 16, further comprising: identifying the second priority parameter associated with the second message, wherein the selecting of the one of the first message or the second message is based at least in part on the identifying of the second priority parameter.

Aspect 18: The method of any of aspects 16 through 17, further comprising: determining that the second priority parameter associated with the second message satisfies the value of the threshold based at least in part on the comparing of the second priority parameter with the threshold, wherein the selecting of the one of the first message or the second message comprises selecting the second message to transmit using the transmission resource of the first UE based at least in part on the determining that the second priority parameter satisfies the value of the threshold.

Aspect 19: The method of any of aspects 16 through 17, further comprising: determining that the second priority parameter associated with the second message fails to satisfy the value of the threshold based at least in part on the comparing of the second priority parameter with the threshold, wherein the selecting of the one of the first message or the second message comprises selecting the first message to transmit using the transmission resource of the first UE based at least in part on the determining that the second priority parameter fails to satisfy the value the threshold.

Aspect 20: The method of any of aspects 16 through 19, wherein the receiving of the value comprises: receiving a control message that includes an indicator for the first UE to modify a current value of the threshold to the value.

Aspect 21: The method of any of aspects 16 through 20, wherein the receiving of the value comprises: receiving a control message that includes the value of the threshold.

Aspect 22: The method of any of aspects 16 through 21, wherein the receiving of the value comprises: receiving a control message that includes an indicator of the value of the threshold that the first UE uses to modify a current value of the threshold to the value.

Aspect 23: The method of any of aspects 16 through 22, wherein the receiving of the value comprises: receiving a MAC-CE comprising an indicator associated with the value of the threshold.

Aspect 24: The method of any of aspects 16 through 23, wherein the receiving of the value comprises: receiving a DCI comprising an indicator associated with the value of the threshold.

Aspect 25: A method for wireless communication at a base station, comprising: identifying a first priority parameter associated with a first message to be conveyed over a first communication link between a first UE and the base station; identifying a value for a threshold for comparing with a second priority parameter associated with a second message to be conveyed over a second communication link between the first UE and a second UE based at least in part on the identifying of the first priority parameter; and transmitting the value of the threshold to the first UE based at least in part on the identifying of the value.

Aspect 26: The method of aspect 25, wherein the transmitting of the value comprises: transmitting a control message that includes an indicator for the first UE to modify a current value of the threshold to the value.

Aspect 27: The method of any of aspects 25 through 26, wherein the transmitting of the value comprises: transmitting a control message that includes the value of the threshold.

Aspect 28: The method of any of aspects 25 through 27, wherein the transmitting of the value comprises: transmitting a control message that includes an indicator of the value of the threshold that the first UE uses to modify a current value of the threshold to the value.

Aspect 29: The method of any of aspects 25 through 28, wherein the transmitting of the value comprises: transmitting a MAC-CE comprising an indicator associated with the value of the threshold.

Aspect 30: The method of any of aspects 25 through 29, wherein the transmitting of the value comprises: transmitting a DCI comprising an indicator associated with the value of the threshold.

Aspect 31: An apparatus for wireless communication at a first UE, comprising a processor; memory coupled with the processor; and instructions stored in the memory and executable by the processor to cause the apparatus to perform a method of any of aspects 1 through 15.

Aspect 32: An apparatus for wireless communication at a first UE, comprising at least one means for performing a method of any of aspects 1 through 15.

Aspect 33: A non-transitory computer-readable medium storing code for wireless communication at a first UE, the code comprising instructions executable by a processor to perform a method of any of aspects 1 through 15.

Aspect 34: An apparatus for wireless communication at a first UE, comprising a processor; memory coupled with the processor; and instructions stored in the memory and executable by the processor to cause the apparatus to perform a method of any of aspects 16 through 24.

Aspect 35: An apparatus for wireless communication at a first UE, comprising at least one means for performing a method of any of aspects 16 through 24.

Aspect 36: A non-transitory computer-readable medium storing code for wireless communication at a first UE, the code comprising instructions executable by a processor to perform a method of any of aspects 16 through 24.

Aspect 37: An apparatus for wireless communication at a base station, comprising a processor; memory coupled with the processor; and instructions stored in the memory and executable by the processor to cause the apparatus to perform a method of any of aspects 25 through 30.

Aspect 38: An apparatus for wireless communication at a base station, comprising at least one means for performing a method of any of aspects 25 through 30.

Aspect 39: A non-transitory computer-readable medium storing code for wireless communication at a base station, the code comprising instructions executable by a processor to perform a method of any of aspects 25 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment, comprising:
    identifying a first message for a base station to be conveyed over a first communication link between the first user equipment and the base station using a transmission resource of the first user equipment;
    identifying a second message for a second user equipment to be conveyed over a second communication link between the first user equipment and the second user equipment using the transmission resource of the first user equipment;
    identifying a priority parameter associated with the first message;
    selecting one of the first message or the second message to transmit using the transmission resource based at least in part on the identifying of the priority parameter associated with the first message for the base station; and
    transmitting the selected one of the first message or the second message using the transmission resource of the first user equipment.

2. The method of claim 1, further comprising:
    identifying a second priority parameter associated with the second message, wherein the selecting of the one of the first message or the second message is based at least in part on the second priority parameter.

3. The method of claim 1, further comprising:
receiving a grant message for the first message from the base station, wherein the identifying of the priority parameter is based at least in part on receiving the grant message.

4. The method of claim 1, further comprising:
identifying that the first message and the second message cannot both be transmitted from the first user equipment using the transmission resource, wherein the selecting of one of the first message or the second message is based at least in part on the identifying that the first message and the second message cannot both be transmitted from the first user equipment using the transmission resource.

5. The method of claim 1, further comprising:
modifying a threshold for comparing with a second priority parameter associated with the second message from a first value to a second value based at least in part on the priority parameter associated with the first message; and
comparing the second priority parameter associated with the second message with the threshold having the second value based at least in part on the modifying of the threshold, wherein the selecting of the one of the first message or the second message is based at least in part on comparing the second priority parameter with the threshold having the second value.

6. The method of claim 5, further comprising:
identifying the second value of the threshold based at least in part on the priority parameter associated with the first message and the second priority parameter associated with the second message, wherein the modifying of the threshold to the second value is based at least in part on the identifying of the second value.

7. The method of claim 6, further comprising:
comparing the priority parameter associated with the first message with the second value of the threshold based at least in part on the identifying of the second value, wherein the modifying of the threshold is based at least in part on the comparing of the priority parameter with the second value.

8. The method of claim 6, further comprising:
determining that the priority parameter associated with the first message satisfies the second value of the threshold based at least in part on the identifying of the second value, wherein the modifying of the threshold to the second value is based at least in part on the determining that the priority parameter satisfies the second value of the threshold.

9. The method of claim 5, further comprising:
determining that the second priority parameter associated with the second message satisfies the second value of the threshold based at least in part on the comparing of the second priority parameter with the threshold, wherein the selecting of the one of the first message or the second message comprises selecting the second message to transmit using the transmission resource of the first user equipment based at least in part on the determining that the second priority parameter satisfies the second value the threshold.

10. The method of claim 5, further comprising:
determining that the second priority parameter associated with the second message fails to satisfy the second value of the threshold based at least in part on the comparing of the second priority parameter with the threshold, wherein the selecting of the one of the first message or the second message comprises selecting the first message to transmit using the transmission resource of the first user equipment based at least in part on the determining that the second priority parameter fails to satisfy the second value the threshold.

11. The method of claim 1, further comprising:
identifying a second value of a threshold for comparing with a second priority parameter associated with the second message different than a first value of the threshold currently used based at least in part on the priority parameter associated with the first message and the second priority parameter associated with the second message;
determining that the priority parameter associated with the first message fails to satisfy the second value of the threshold based at least in part on the identifying of the second value; and
maintaining the threshold at the first value based at least in part on the determining that the priority parameter fails to satisfy the second value.

12. The method of claim 1, further comprising:
comparing the priority parameter associated with the first message with a second priority parameter associated with the second message, wherein the selecting of the one of the first message or the second message is based at least in part on the comparing of the priority parameter with the second priority parameter.

13. The method of claim 12, further comprising:
identifying the priority parameter associated with the first message; and
identifying the second priority parameter associated with the second message, wherein the comparing of the priority parameter with the second priority parameter is based at least in part on the identifying of the priority parameter and the second priority parameter.

14. The method of claim 1, further comprising:
determining that the priority parameter is greater than a second priority parameter associated with the second message, wherein the selecting of the one of the first message or the second message comprises selecting the first message to transmit using the transmission resource of the first user equipment based at least in part on the determining that the priority parameter is greater than the second priority parameter.

15. The method of claim 1, further comprising:
determining that the priority parameter is less than a second priority parameter associated with the second message, wherein the selecting of the one of the first message or the second message comprises selecting the second message to transmit using the transmission resource of the first user equipment based at least in part on the determining that the priority parameter is less than the second priority parameter.

16. A method for wireless communication at a first user equipment, comprising:
receiving, from a base station, a value of a threshold for determining whether to send a first message or a second message using a transmission resource of the first user equipment, the first message to be conveyed over a first communication link between the first user equipment and the base station, the second message to be conveyed over a second communication link between the first user equipment and a second user equipment, wherein the value is based at least in part on a first priority parameter associated with the first message;
modifying the threshold to the value based at least in part on the receiving of the value from the base station;

comparing a second priority parameter associated with the second message with the threshold at the value based at least in part on the modifying of the threshold;

selecting one of the first message or the second message to transmit using the transmission resource based at least in part on the comparing of the second priority parameter with the threshold; and transmitting the selected one of the first message or the second message using the transmission resource of the first user equipment.

17. The method of claim 16, further comprising:
identifying the second priority parameter associated with the second message, wherein the selecting of the one of the first message or the second message is based at least in part on the identifying of the second priority parameter.

18. The method of claim 16, further comprising:
determining that the second priority parameter associated with the second message satisfies the value of the threshold based at least in part on the comparing of the second priority parameter with the threshold, wherein the selecting of the one of the first message or the second message comprises selecting the second message to transmit using the transmission resource of the first user equipment based at least in part on the determining that the second priority parameter satisfies the value of the threshold.

19. The method of claim 16, further comprising:
determining that the second priority parameter associated with the second message fails to satisfy the value of the threshold based at least in part on the comparing of the second priority parameter with the threshold, wherein the selecting of the one of the first message or the second message comprises selecting the first message to transmit using the transmission resource of the first user equipment based at least in part on the determining that the second priority parameter fails to satisfy the value the threshold.

20. The method of claim 16, wherein the receiving of the value comprises:
receiving a control message that includes an indicator for the first user equipment to modify a current value of the threshold to the value.

21. The method of claim 16, wherein the receiving of the value comprises:
receiving a control message that includes the value of the threshold.

22. The method of claim 16, wherein the receiving of the value comprises:
receiving a control message that includes an indicator of the value of the threshold that the first user equipment uses to modify a current value of the threshold to the value.

23. The method of claim 16, wherein the receiving of the value comprises:
receiving a medium access control (MAC) control element comprising an indicator associated with the value of the threshold.

24. The method of claim 16, wherein the receiving of the value comprises:
receiving a downlink control information comprising an indicator associated with the value of the threshold.

25. A method for wireless communication at a base station, comprising:
identifying a first priority parameter associated with a first message to be conveyed over a first communication link between a first user equipment and the base station;

identifying a value for a threshold for comparing with a second priority parameter associated with a second message to be conveyed over a second communication link between the first user equipment and a second user equipment based at least in part on the identifying of the first priority parameter; and transmitting the value of the threshold to the first user equipment based at least in part on the identifying of the value.

26. The method of claim 25, wherein the transmitting of the value comprises:
transmitting a control message that includes an indicator for the first user equipment to modify a current value of the threshold to the value.

27. The method of claim 25, wherein the transmitting of the value comprises:
transmitting a control message that includes the value of the threshold.

28. The method of claim 25, wherein the transmitting of the value comprises:
transmitting a control message that includes an indicator of the value of the threshold that the first user equipment uses to modify a current value of the threshold to the value.

29. The method of claim 25, wherein the transmitting of the value comprises:
transmitting a medium access control (MAC) control element or a downlink control information comprising an indicator associated with the value of the threshold.

30. An apparatus for wireless communication at a first user equipment, comprising:
a processor,
a memory coupled with the processor; and
instructions stored in the memory and executable by the processor to cause the apparatus to:
identify a first message for a base station to be conveyed over a first communication link between the first user equipment and the base station using a transmission resource of the first user equipment;
identify a second message for a second user equipment to be conveyed over a second communication link between the first user equipment and the second user equipment using the transmission resource of the first user equipment;
identify a priority parameter associated with the first message to be conveyed over the first communication link;
select one of the first message or the second message to transmit using the transmission resource based at least in part on the identifying of the priority parameter associated with the first message for the base station; and
transmit the selected one of the first message or the second message using the transmission resource of the first user equipment.

* * * * *